United States Patent
Yatake

(10) Patent No.: US 7,030,174 B2
(45) Date of Patent: Apr. 18, 2006

(54) INK SET FOR INK JET-JET RECORDING, METHOD FOR INK-JET RECORDING AND RECORDED MATTER

(75) Inventor: Masahiro Yatake, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 10/148,160

(22) PCT Filed: Sep. 26, 2001

(86) PCT No.: PCT/JP01/08381

§ 371 (c)(1),
(2), (4) Date: May 24, 2002

(87) PCT Pub. No.: WO02/26898

PCT Pub. Date: Apr. 4, 2002

(65) Prior Publication Data

US 2003/0078320 A1 Apr. 24, 2003

(30) Foreign Application Priority Data

Sep. 27, 2000 (JP) .................................. 2000-294337

(51) Int. Cl.
*C09D 11/10* (2006.01)
*C08K 9/10* (2006.01)
*C08K 3/04* (2006.01)

(52) U.S. Cl. ..................... 523/160; 523/205; 524/495

(58) Field of Classification Search ............... 523/160, 523/161, 200, 205; 106/31.6, 31.85, 31.89; 524/495
See application file for complete search history.

(56) References Cited

U.S. PATENT DOCUMENTS

| | | | | |
|---|---|---|---|---|
| 5,981,623 A | * | 11/1999 | McCain et al. | 523/160 |
| 6,114,411 A | * | 9/2000 | Nakamura et al. | 523/161 |
| 6,274,646 B1 | * | 8/2001 | Watanabe et al. | 523/161 |
| 6,387,168 B1 | * | 5/2002 | Koitabashi et al. | 106/31.6 |
| 6,425,662 B1 | * | 7/2002 | Teraoka et al. | 347/100 |
| 6,454,403 B1 | * | 9/2002 | Takada et al. | 347/100 |
| 6,511,534 B1 | * | 1/2003 | Mishina et al. | 106/31.33 |
| 6,602,333 B1 | * | 8/2003 | Miyabayashi | 106/31.27 |
| 2003/0048342 A1 | * | 3/2003 | Kashiwazaki et al. | 347/100 |

FOREIGN PATENT DOCUMENTS

| | | | |
|---|---|---|---|
| EP | 978547 A1 | * | 2/2000 |
| EP | 1035180 A1 | * | 9/2000 |
| EP | 1077238 A1 | * | 2/2001 |
| EP | 1114851 | | 7/2001 |
| EP | 1 291 397 | | 3/2003 |
| EP | 1 295 916 | | 3/2003 |
| JP | 9 151342 | | 6/1997 |
| JP | 10-140063 | | 5/1998 |
| JP | 10 140064 | | 5/1998 |
| JP | 10204347 | | 8/1998 |
| JP | 1 180633 | | 3/1999 |
| JP | 11 140343 | | 5/1999 |
| JP | 2000141714 | | 5/2000 |
| JP | 2001254039 | | 9/2001 |

* cited by examiner

*Primary Examiner*—Callie Shosho
(74) *Attorney, Agent, or Firm*—Ladas and Parry LLP

(57) ABSTRACT

An ink set for ink jet recording and an ink jet recording process, which can provide not only high weather resistance but also images having a high printed density by using pigment inks, and have a wide color reproducing range. Also, an ink jet recording process capable of performing text printing at a high printing density and with excellent abrasion resistance. Furthermore, recorded matter having images formed at a high printed density and over a wide color reproducing range, and text printed matter (recorded matter) having a high printed density and being excellent in abrasion resistance The ink set for ink jet recording includes a black ink containing at least "carbon black dispersible in an aqueous medium without a dispersing agent", at least one color ink containing at least "a colorant enclosing a color pigment with a polymer", a glycol ether compound and water. Also, an ink jet recording process using the ink set, and recorded matter printed by the recording process.

36 Claims, No Drawings

INK SET FOR INK JET-JET RECORDING, METHOD FOR INK-JET RECORDING AND RECORDED MATTER

TECHNICAL FIELD

The present invention relates to an ink set for ink jet recording, an ink jet recording process, and recorded matter.

BACKGROUND

Ink jet recording is a process of recording letters or drawings on the surface of a recording medium by ejecting an ink from a fine nozzle as droplets. As the ink jet recording process, a process of converting electric signals to mechanical signals using an electrostrictive element, and intermittently ejecting an ink reserved in a nozzle head section to record letters or symbols on the surface of a recording medium, a process rapidly heating a part of an ink reserved in a nozzle head section and positioned at very close to the ejecting portion to generate bubbles, and intermittently ejecting the ink by the volume expansion caused by the bubbles to record letters or symbols on the surface of a recording medium, etc., have been practically used.

As the ink supplying system in ink jet recording, a method of using an ink set comprising a combination of plural inks each having a different color is known. According to such an ink set, there is an advantage that the kind and the ejecting amount of each ink to be ejected from the ink set are selected from time to time according to a signal based on image information, thereby color images of high quality can be easily obtained.

As the inks for use in such an ink set, inks obtained by dissolving various kinds of water-soluble dyes in aqueous media are generally widely used, but recently, there have been provided inks obtained by dispersing pigments in aqueous media with the aid of dispersing agents. This is because inks using pigments (hereinafter, sometimes referred to as a pigment ink) have the feature of being excellent in weather resistance (water resistance, light resistance and the like) as compared with inks using water-soluble dyes.

However, with the ink set comprising pigment inks, which has hitherto been known, though high weather resistance can be obtained due to the use of the pigment inks, there are problems that the color reproducing range is insufficient and it is hard to reproduce images exactly. It is the current actual state that since an ink jet recording process has recently be given attention as a recording process that could take the place of photographs, an ink set comprising pigment inks which can attain further high image quality has been demanded.

The present invention is to solve the above-described problems, and an object thereof is to provide an ink set for ink jet recording and an ink jet recording process, which can not only obtain high weather resistance due to the use of pigment inks but also can obtain images having a high printed density and which have a wide color reproducing range.

Another object of the invention is to provide an ink jet recording process capable of performing text printing at a high printing density and with excellent abrasion resistance.

Still other object of the invention is to provide recorded matter having images formed at a high printed density and over a wide color reproducing range, and to provide text printed matter (recorded matter) having a high printed density and being excellent in abrasion resistance.

DISCLOSURE OF THE INVENTION

The present inventors have this time found that by using a specific pigment for each of a black ink and color inks of an ink set, ink jet recording having a wide color reproducing range can be attained, to thereby accomplish the present invention. That is, the invention is as set forth below.

1. An ink set for ink jet recording comprising:

a black ink containing at least "carbon black dispersible in an aqueous medium without a dispersing agent" and water; and at least one color ink containing at least "a colorant enclosing a color pigment with a polymer" and water.

2. The ink set for ink jet recording according to item 1 above, wherein at least one ink selected from the group consisting of said black ink and said at least one color ink contains at least one water-soluble organic solvent selected from the group consisting of acetylene glycol-based surface-active agents, acetylene alcohol-based surface-active agents, glycol ether compounds, 1,2-alkylene glycols, and the compounds represented by the following formula (1):

$$RO\text{-}(EP)_n\text{-}M \qquad (1)$$

wherein

R: a group having from 4 to 10 carbon atoms selected from the group consisting of an alkyl group, a cycloalkyl group, a phenyl alkyl group and an aryl group;

O: an oxygen atom;

EP: repeat of an ethyleneoxy group and/or a propylene oxy group;

n: an average value in the molecule and is from 1 to 30; and

M: a hydrogen atom, a sulfonate, a phosphate or a borate group.

3. The ink set for ink jet recording according to item 1 above, wherein at least one ink selected from the group consisting of said black ink and said at least one color ink contains as water-soluble organic solvents:

at least one surface-active agent selected from the group consisting of acetylene glycol-based surface-active agents and acetylene alcohol-based surface-active agents; and at least one compound selected from the group consisting of glycol ether compounds, 1,2-alkylene glycols and the compounds represented by the following formula (1):

$$RO\text{-}(EP)_n\text{-}M \qquad (1)$$

wherein

R: a group having from 4 to 10 carbon atoms selected from the group consisting of an alkyl group, a cycloalkyl group, a phenyl alkyl group and an aryl group;

O: an oxygen atom;

EP: repeat of an ethyleneoxy group and/or a propylene oxy group;

n: an average value in the molecule and is from 1 to 30; and

M: a hydrogen atom, a sulfonate group, a phosphate group or a borate group.

4. The ink set for ink jet recording according to item 2 or 3 above, wherein said water-soluble organic solvent is present from 0.5% by weight to 30% by weight with respect to the whole amount of the ink.

5. The ink set for ink jet recording according to any one of items 2 to 4 above, wherein at least one surface-active agent selected from the group consisting of the acetylene glycol-based surface-active agents and the acetylene alcohol-based surface-active agents is present not more than 5% by weight with respect to the whole amount of the ink.

6. The ink set for ink jet recording according to any one of items 2 to 5 above, wherein said at least one ink selected from the group consisting of said black ink and said at least one color ink contains:

not more than 0.5% by weight of at least one surface-active agent selected from the group consisting of the acetylene glycol-based surface-active agents and the acetylene alcohol-based surface-active agents; and not less than 1% by weight of at least one compound selected from the group consisting of the glycol ether compounds, the 1,2-alkylene glycols and the compounds represented by formula (1).

7. The ink set for ink jet recording according to any one of items 2 to 6 above, wherein said at least one ink selected from the group consisting of said black ink and said at least one color ink contains not less than 0.5% by weight of at least one surface-active agent selected from the group consisting of the acetylene glycol-based surface-active agents and the acetylene alcohol-based surface-active agents, and has a weight ratio of said surface-active agent and the glycol ether compound is from 1:0 to 1:10.

8. The ink set for ink jet recording according to any one of items 2 to 7 above, wherein said at least one ink selected from the group consisting of said black ink and said at least one color ink contains not less than 0.5% by weight of at least one surface-active agent selected from the group consisting of the acetylene glycol-based surface-active agents and the acetylene alcohol-based surface-active agents, and has a weight ratio of said surface-active agent and the 1,2-alkylene glycol is from 1:0 to 1:10.

9. The ink set for ink jet recording according to any one of items 2 to 8 above, wherein said at least one ink selected from the group consisting of said black ink and said at least one color ink contains not less than 0.5% by weight of at least one surface-active agent selected from the group consisting of the acetylene glycol-based surface-active agents and the acetylene alcohol-based surface-active agents, and has a ratio of said surface-active agent and the compound represented by formula (1) is from 1:0 to 1:10.

10. The ink set for ink jet recording according to any one of items 2 to 9 above, wherein the glycol ether compound is one or a mixture of two or more selected from the group consisting of diethylene glycol monobutyl ether, triethylene glycol monobutyl ether, propylene glycol monobutyl ether, and dipropylene glycol monobutyl ether.

11. The ink set for ink jet recording according to item 10 above, wherein said at least one ink selected from the group consisting of said black ink and said at least one color ink contains not more than 10% by weight of at least one compound selected from the group consisting of said propylene glycol monobutyl ether and said dipropylene glycol monobutyl ether.

12. The ink set for ink jet recording according to item 10 or 11 above, wherein said at least one ink selected from the group consisting of said black ink and said at least one color ink contains not more than 20% by weight of at least one compound selected from the group consisting of said diethylene glycol monobutyl ether and said triethylene glycol monobutyl ether.

13. The ink set for ink jet recording according to any one of items 2 to 12 above, wherein said at least one ink selected from the group consisting of said black ink and said at least one color ink contains not more than 10% by weight of a 1,2-alkylene glycol having from 4 to 10 carbon atoms as said 1,2-alkylene glycol with respect to the whole amount of the ink.

14. The ink set for ink jet recording according to any one of items 2 to 13 above, wherein said 1,2-alkylene glycol is 1,2-pentanediol and/or 1,2-hexanediol.

15. The ink set for ink jet recording according to any one of items 2 to 14 above, wherein said at least one ink selected from the group consisting of said black ink and said at least one color ink contains not more than 10% by weight of the compound represented by formula (1).

16. The ink set for ink jet recording according to any one of items 1 to 15 above, wherein said polymer enclosing the color pigment comprises, as main component(s), at least one compound selected from the group consisting of polyacrylic acid esters, styrene-acrylic acid copolymers, polystyrenes, polyesters, polyamides, polyimides, silicon-containing polymers and sulfur-containing polymers.

17. The ink set for ink jet recording according to any one of items 1 to 16 above, wherein said polymer enclosing the color pigment is a copolymer of a dispersing agent having at least a polymerizable group and a copolymerizable monomer copolymerizable with the dispersing agent.

18. The ink set for ink jet recording according to item 17 above, wherein said copolymer is obtained by dispersing the color pigment in water with the dispersing agent having a polymerizable group, and then emulsion-polymerizing the dispersing agent and the monomer copolymerizable with the dispersing agent in water using a polymerization initiator.

19. The ink set for ink jet recording according to any one of items 1 to 15 above, wherein said polymer enclosing the color pigment is a polymer having a crosslinked structure.

20. The ink set for ink jet recording according to item 19 above, wherein said polymer having a crosslinked structure is obtained by contacting an organic phase containing at least a crosslinking agent and a polymer having a crosslinking reactive group and a hydrophilic group with an aqueous phase to cause a phase inversion emulsification, thereby enclosing a color pigment with the polymer, and then carrying out a crosslinking reaction of the polymer and a crosslinking agent.

21. The ink set for ink jet recording according to item 20 above, wherein said polymer having a crosslinking reactive group and a hydrophilic group comprises, as main component(s), at least one member selected from the group consisting of a vinyl-based polymer, a poly(meth)acrylic acid ester, a styrene-(meth)acrylic acid copolymer, a polyester, a polyamide, a polyimide, a polyurethane, an amino-based polymer, a silicon-containing polymer, a sulfur-containing polymer, a fluorine-containing polymer, and an epoxy-based resin.

22. The ink set for ink jet according to item 19 above, wherein said polymer having a crosslinked stricture is a polymer of a dispersing agent having a polymerizable group and a crosslinkable monomer.

23. The ink set for ink jet according to item 22 above, wherein said polymer having a crosslinked structure is obtained by dispersing a color pigment in water with a dispersing agent having a polymerizable group, and then adding thereto at least a crosslinkable monomer and a polymerization initiator to effect polymerization.

24. The ink set for ink jet recording according to any one of items 1 to 23 above, wherein said black ink contains polymer fine particles.

25. An ink jet recording process using an ink set for ink jet recording according to any one of items 1 to 24 above.

26. The ink jet recording process according to item 25 above, wherein said ink set for ink jet recording comprises a magenta ink, a cyan ink and a yellow ink as the color inks, and wherein text printing is carried out using a composite black formed by combining the magenta ink, the cyan ink and the yellow ink, in combination with said black ink of said ink set for ink jet recording.

27. The ink jet recording process according to item 26 above, wherein said black ink contains polymer fine particles, and text printing is carried out onto an ink jet recording medium.

28. The ink jet recording process according to item 26 or 27 above, wherein said composite black and said black ink are used in a weight ratio of from 20:80 to 65:35.

29. Recorded matter printed by the ink jet recording process according to any one of items 25 to 28 above.

BEST MODE FOR CARRYING OUT THE INVENTION

The ink set for ink jet recording (hereinafter, sometimes referred to simply as "ink set") of the invention comprises a black ink containing at least "carbon black dispersible in an aqueous medium (water or a solvent comprising water as the main component) without a dispersing agent" and water and at least one color ink containing at least "a colorant enclosing a color pigment with a polymer" and water.

Examples of the "carbon black dispersible in an aqueous medium without a dispersing agent" include carbon black particles having a hydrophilic group on the surfaces thereof, which can be suitably prepared by treating the surfaces of carbon black particles with a hydrophilic group-imparting agent. Therefore, there is no particular restriction on the carbon black constituting "the carbon black particles having a hydrophilic group on the surfaces thereof" as long as the carbon black is not dissolved in the hydrophilic group-imparting agent. From such a view point, examples of the carbon black to be contained in the black ink include carbon blacks (C.I. Pigment Black 7),-such as furnace black, lamp black, acetylene black, channel black, etc. More specifically, No. 2300, No. 900, MCF88, No. 33, No. 40, No. 45, No. 52, MA7, MA8, MA100, No 2200B, etc., manufactured by Mitsubishi Chemical Corporation; Raven 5750, Raven 5250, Raven 5000, Raven 3500, Raven 1255, Raven 700, etc., manufactured Columbia Ribbon & Carbon Mfg. Co., Inc.; Regal 400R, Regal 330R, Regal 660R, Mogul L, Monarch 700, Monarch 800, Monarch 880, Monarch 900, Monarch 1000, Monarch 1100, Monarch 1300, Monarch 1400, etc., manufactured by Cabot Corporation; Color Black FW1, Color Black FW2, Color Black Fw2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, etc., manufactured by Degussa Corporation, etc., can be used.

As a suitably hydrophilic group-imparting agent for treating the surfaces of carbon black particles, it can be firstly cited treating agents having a sulfur atom.

Examples of the treating agent having a sulfur atom include sulfuric acid, fuming sulfuric acid, sulfur trioxide, chlorosulfuric acid, fluorosulfuric acid, amidosulfuric acid, a sulfonated pyridine salt, sulfamic acid, etc. Of these compounds, sulfur trioxide, and sulfonating agents such as sulfonated pyridine salt, sulfamic acid, etc., are suitable. They can be used singly or as a mixture of two or more thereof.

(Incidentally, "the sulfonating agent" is a treating agent for imparting sulfonic acid (—$SO_2OH$) and/or sulfinic acid (—$RSO_2H$: R is an alkyl group having from 1 to 12 carbon atoms, or a phenyl group or modified substance thereof).)

Also, it is useful to form a complex of above-described sulfur trioxide with a mixed solvent of a solvent (for example, basic solvents such as N,N-dimethylformamide dioxane, pyridine, triethylamine, trimethylamine, etc.; nitromethane, acetonitrile, etc.) capable of forming a complex with sulfur trioxide and at least one solvent as described below.

Particularly, in the case where the reactivity is too large with sulfur trioxide per se, to thereby decompose or denature carbon black itself or to make it difficult to control the reaction with a strong acid, it is preferred to carry out the surface treatment (in this case, sulfonation) of carbon black particles using the complex of sulfur trioxide and a tertiary amine as described above.

Also, carbon black particles are easily dissolved when sulfuric acid, fuming sulfuric acid, chlorosulfuric acid, fluorosulfuric acid, or the like is used as a simple substance, and hence with respect to such a strong acid as reacting per one molecule, it is necessary to suppress the reaction and to take care of the kind and using amount of the solvent described below.

The solvent used for the reaction is selected from solvents which do not react with the treating agent containing sulfur and in which the above-described pigment becomes insoluble or sparingly soluble. Examples thereof include sulfolan, N-methyl-pyrrolidone, dimethylacetamide, quinoline, hexamethyl phosphoric triamide, chloroform, dichloroethane, tetrachloroethane, tetrachloroethylene, dichloromethane, nitromethane, nitrobenzene, liquid sulfur dioxide, carbon disulfide, trichlorofluoromethane, etc.

The treatment with a treating agent containing sulfur is carried out by dispersing carbon black particles in the solvent, adding the treating agent containing sulfur into the dispersion, heating to a temperature of from 60 to 200° C., and stirring for from 3 to 10 hours. Specifically, a method of previously high-speed shear dispersing the carbon black particles by a high-speed mixer, etc., or impact dispersing by a beads mill, a jet mill, etc., to form a slurry (dispersion) is preferred. Thereafter, the operation is transferred to mild stirring, and then the treating agent containing sulfur is added to introduce a hydrophilic group into the surfaces of the carbon black particles. Herein, the determination of the introducing amount of the hydrophilic group greatly depends on the reaction condition and the kind of the treating agent containing sulfur. After carrying out a subsequent heat treatment, from the slurry of the carbon black particles, the solvent and the remaining treating agent containing sulfur are removed. For the removal of them, a method of water washing, an ultrafiltration, a reverse osmosis, etc., or a centrifugal separation, a filtration, etc., is repeatedly carried out.

Furthermore, carbon black particles may be made to have on the surface thereof a sulfonic acid anion group (—$SO_3^-$) and/or a sulfinic acid anion group (—$RSO_2^-$: R is an alkyl group having from 1 to 12 carbon atoms, or a phenyl group or modified substance thereof) by treating the above-described sulfonic acid (—$SO_2OH$) and/or sulfinic acid (—$RSO_2OH$: R is an alkyl group having from 1 to 12 carbon atoms, or a phenyl group or modified substance thereof) with an alkali compound.

As the alkali compound, an alkali compound which cation is an alkali metal ion or a monovalent ion represented by the chemical formula: $(R_1R_2R_3R_4N)^+$ (wherein $R_1$, $R_2$, $R_3$ and $R_4$, which may be the same or different, each represents a hydrogen atom, an alkyl group, a hydroxyalkyl group or a halogenated alkyl group) is selected. The alkali compound is preferably an alkali compound which cation is a lithium ion ($Li^+$), a potassium ion ($K^+$), a sodium ion ($Na^+$), an ammonium ion ($NH_4^+$), or an alkanolamine cation such as a triethanolamine cation, etc.

As the anion of the alkali compound, a hydroxide anion is suitably used, and specific examples thereof include ammonia, alkanolamines (monoethanolamine, diethanolamine, N,N-butylethanolamine, triethanolamine, propanolamine, aminomethyl propanol, 2-aminoisopropanol, etc.), and hydroxides of a monovalent alkali metal (LiOH, NaOH, KOH, etc.).

The addition amount of the above-described alkali compound is preferably at least the neutralization equivalent of the sulfonic acid group and/or the sulfinic acid group of the carbon black particles. Furthermore, the addition amount of an additive having volatility, such as ammonia, an alkanolamine, etc., is preferably at least about 1.5 times the neutralization equivalent.

In addition, the operation can be carried out by adding the above-described carbon black particles having chemically bonded to the surfaces thereof a sulfonic acid group and/or a sulfinic acid group into the alkali compound and shaking the mixture by a paint shaker, etc.

Also, as the hydrophilic group-imparting agent for treating the surfaces of carbon black particles, a carboxylating agent can be suitably used. Herein, the "carboxylating agent" is a treating agent for imparting a carboxylic acid group ($-CO_2H$).

As the carboxylating agent, an oxidizing agent such as a hypohalogenous acid salt including sodium hypochlorite, potassium hypochloride, etc. is used, and the treatment is carried out by partially cutting the bonds (C=C, C—C) on the surfaces of the pigment particles, followed by oxidation. Also, as other methods than the above-described chemical treatment, there is also a case of imparting a carboxylic acid group by a physical oxidation such as a plasma treatment, etc. In the invention, various methods can be selected so long as it is a treatment method capable of ensuring the dispersion stability in an aqueous medium. Furthermore, in the treatment of introducing a carboxylic acid group as illustrated above, there is also a case of introducing a quinone group, etc., although the amount is small.

As an example of the treatment with a carboxylating agent, carbon black particles are previously high-speed shear dispersing in an aqueous medium by a high-speed mixer, etc., or impact-dispersing by a beads mill, a jet mill, etc., to form a slurry (dispersion). Then, the slurry is mixed with a hypohalogenous acid salt such as sodium hypochlorite at an effective halogen concentration of from 10 to 30% in a suitable amount of water, followed by heating to a temperature of from 60 to 80° C., and stirring for from about 5 to, 10 hours, preferably 10 hours or longer. Since the work is accompanied with a considerable generation of heat, a care for safety is necessary. Thereafter, from the slurry of the surface-treated carbon black particles, the solvent and the remaining carboxylating agent are removed by heat treatment. Also, if necessary, by repeatedly carrying out a method of water washing, an ultrafiltration, a reverse osmosis, etc., or a centrifugal separation, a filtration, etc., a desired aqueous dispersion can be obtained.

Also herein, by treating the carbon black particles having a carboxylic acid group ($-CO_2H$) with the alkali compound, the pigment particles may be made to have a carboxylic acid anionic group ($-CO_2^-$) on the surfaces thereof.

The kind of the alkali compound and the treatment method with the alkali compound are the same as described above.

Then, the methods of determining a preferred introducing amount of a hydrophilic group onto the surfaces of carbon black particles and the introduced state are explained.

Firstly, in the case of carrying out the introduction of a hydrophilic group with a sulfonating agent, the introducing amount of the hydrophilic group onto the surfaces of carbon black particles is preferably at least $10 \times 10^{-6}$ equivalent per gram of the carbon black particles. When the introduced amount of a hydrophilic group becomes less than $10 \times 10^{-6}$ equivalent, the carbon black particles are liable to be aggregated and the mean particle size of the microcapsulated pigment tends to be increased.

There is no particular restriction on the upper limit of the introducing amount of a hydrophilic group to the carbon black particles. However, when the introduced amount thereof becomes more than $150 \times 10^{-6}$ equivalent, it sometimes happens that the change of the mean particle size of the carbon black particles with the increase of the introduced amount of the hydrophilic group is not recognized. The introduced amount thereof is preferably not more than $150 \times 10^{-6}$ equivalent from the point of cost.

Then, the introducing amount of a hydrophilic group onto the surfaces of carbon black particles with a carboxylating agent is explained. In the surface treatment method for use in the invention, it is considered that a carboxylic acid group ($-CO_2H$) and/or a carboxylic acid anionic group ($-CO_2^-$) is introduced on the surfaces of carbon black particles. However, since the introduced amount cannot be directly obtained, the introduced amount in the present invention is measured by the content of active hydrogen on the surfaces. The detailed measurement method is described below.

The content of the active hydrogen in the carbon black particles obtained by such a method is preferably at least 1.0 mmol/g, and more preferably at least 1.5 mmol/g. When the content of the active hydrogen is less than 1.0 mmol/g, the water dispersibility becomes bad, thereby coalescence (a phenomenon of naturally gathering particles to form large particles) is liable to occur during the microcapsulation process.

While the carbon black particles having a hydrophilic group on the surfaces thereof have been described above in detail, the mean particle size of the carbon black particles having a hydrophilic group on the surfaces thereof can be easily reduced smaller than 150 nm in accordance with the above-described method. In particular, it is more preferred to make the mean particle size from 20 nm to 80 nm by selecting the kinds of the pigment and hydrophilic group-imparting agent and the introduced amount of the hydrophilic group, whereby a black ink being excellent in the dispersion stability and the ejection stability (the characteristics of stably ejecting from a recording head to a definite direction) and capable of increasing the printing density of images can be surely prepared. (In the present specification, the description regarding the mean particle size is made based on the measured value with a laser light scattering method.)

Also, the content of "carbon black dispersible in an aqueous medium without dispersing agent" with respect to the black ink is in the range of preferably from 0.1 to 25% by weight, and more preferably from 0.5 to 10% by weight.

Next, color inks are explained below. The ink set of the invention comprises at least one color ink, and examples of the color ink includes a yellow ink, a magenta ink, a cyan ink, a green ink and the like. Herein, each of the color inks contains "a colorant enclosing a color pigment with a polymer" and water.

Examples of the color pigment used for the yellow ink include C.I. Pigment Yellow 1 (Fast Yellow G), 2, 3, 12 (Disazo Yellow AAA), 13, 14, 16, 17, 24, 34, 35, 37, 42

(yellow iron oxide), 53, 55, 73, 74, 75, 81, 83 (Disazo Yellow HR), 93, 95, 97, 98, 100, 101, 104, 108, 109, 110, 114, 117, 120, 128, 129, 138, 151, 153 and 154.

Examples of the color pigment used for the magenta ink include C.I. Pigment Red 1, 2, 3, 5, 7, 12, 17, 22 (Brilliant Fast Scarlet), 23, 31, 38, 48(Ca), 48(Mn), 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1. 57 (Ca), 57:1 (Brilliant Carmine 6B), 60:1, 63:1, 63:2, 64:1, 81 (Rhodamine 6G Lake), 83, 88, 101 (iron oxide red), 104, 105, 106, 108 (Cadmium Red), 112, 114, 122 (Quinacridone Magenta), 123, 146, 149, 166, 168, 170, 172, 177, 178, 179, 184, 185, 190, 193, 202, 209 and 219.

Examples of the color pigment used for the cyan ink include C.I. Pigment Blue 1, 2, 3, 15 (Phthalocyanine Blue R), 15:1, 15:2, 15:3 (Phthalocyanine Blue G), 15:4, 15:6 (Phthalocyanine Blue E), 15:34, 16, 17: 1, 22, 56, 60 and 63, and C.I. Vat Blue 4 and C.I. Vat Blue 60.

Examples of the color pigment used for the green ink include C.I. Pigment Green 1, 4, 7, 8, 10, 17, 18 and 36.

The particle sizes of these color pigments are preferably not larger than 1 μm, and more preferably from 0.01 to 0.15 μm from the viewpoint of the ejection stability.

Then, the "colorant enclosing a color pigment with a polymer" is specifically explained. Incidentally, the term "enclosing" used in the invention is the state of completely enclosing a color pigment with a polymer.

The above-described polymer enclosing the color pigment preferably comprises at least one member selected from the group consisting of a polyacrylic acid ester, a styrene-acrylic acid copolymer, a vinyl polymer (vinyl-based polymer) such as polystyrene, etc., a polyester, a polyamide, a polyimide, a silicon-containing polymer, and a sulfur-containing polymer as the main component. By using the colorant enclosing a color pigment with a polymer described above as the colorant for each of the color inks, a stable ejection is obtained and good images can be obtained.

In a particularly preferred embodiment of the invention, as the above-described polymer, it can be suitably used a polymer obtained by polymerizing a monomer or an oligomer having an acryloyl group, a methacryloyl group, a vinyl group, or an allyl group as a double bond in accordance with a known polymerization method using a polymerization initiator.

Herein, as the monomer, for example, there can be used monofunctional monomers such as styrene, tetrahydrofurfuryl acrylate, butyl methacrylate, (α, 2, 3, or 4)-alkylstyrene, (α, 2, 3, or 4)-alkoxystyrene, 3,4-dimethylstyrene, α-phenylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, other alkyl (meth)acrylates, methoxydiethylene glycol (meth)acrylate, the (meth)acrylate of diethylene glycol or polyethylene glycol of an ethoxy group, a propoxy group or a butoxy group, cyclohexyl (meth)acrylate, benzyl (meth)acrylate, phenoxyethyl (meth)acrylate, isobonyl (meth)acrylate, hydroxyalkyl (meth)acrylate, fluorine-containing, chlorine-containing, or silicon-containing (meth)acrylate, (meth)acrylamide, maleic acid amide; and in the case of introducing a crosslinked structure in addition to a mono-function, e.g., introduction of (meth)acrylic acid, there can be used compounds having an acryl group or a methacryl group, such as (mono, di, tri, tetra, poly)ethylene glycol di(meth)acrylates, the (meth)acrylates of 1,4-butanediol, 1,5-pentanediol, 1,6-hexanediol, 1,8-octanediol, 1,10-decanediol, etc., trimethylolpropane tri (meth)acrylate, glycerol (di, tri) (meth)acrylates, the di(meth)acrylate of the ethylene oxide adduct of bisphenol A or bisphenol F, pentaerythritol tetra(meth)acrylate, dipentaerythritol hexa(meth)acrylate, etc.

As the polymerization initiator for use in the invention, in addition to potassium persulfate and ammonium persulfate, general initiators used for a radical polymerization, such as hydrogen persulfate, azobisisobutyronitrile, benzoyl peroxide, dibutyl peroxide, peracetic acid, cumene hydroperoxide, t-butyl hydroxyperoxide, para-methane hydroxyperoxide, etc., can be used. Water-soluble polymerization initiators are preferably used.

Examples of the method of enclosing a color pigment with such a polymer include, firstly, a phase inversion emulsification method, an acid deposition method, and a forced emulsification method.

As a specific example of the phase inversion emulsification method, a method of dissolving a self water-dispersing resin (self water-dispersing polymer), wherein a part of an acid group is neutralized with a base, in an organic solvent, and carrying out a phase inversion emulsification by mixing a colored resin solution obtained by dispersing or dissolving a color pigment in the solution and an aqueous medium comprising water as its indispensable component is known. Upon phase inversion emulsification, particles of the colorant enclosing the color pigment with the above-described resin are formed and thus, in succession, by removing the organic solvent from the aqueous medium, a colorant enclosing the color pigment with the polymer can be suitably obtained. Herein, as the self water-dispersing resin, a copolymer of: at least one monomer selected from the group consisting of styrene having an acid value of from 20 to 200 KOH g/g, a substituted styrene and a (meth)acrylic acid ester; and (meth)acrylic acid can be suitably illustrated.

Also, as another specific example of the phase inversion emulsification, a method of adding a polyester to a ketone-based solvent together with a color pigment, and, after ionizing the carboxyl group in the polyester by adding a neutralizing agent to the ketone-based solvent, adding water thereto to carry out phase inversion emulsification is known. By distilling off the ketone-based solvent from the mixed solution, a colorant enclosing the color pigment with the polyester can be suitably obtained.

As the acid deposition method, there can be illustrated a method of adding an acidic compound to an aqueous dispersion of a color pigment finely dispersed with "a resin (polymer) having a carboxyl group neutralized using a basic compound" to make the pH of the aqueous dispersion neutral or acidic, whereby making the resin hydrophobic and strongly fixing the resin to the color pigment. Then, a basic compound is added to the aqueous dispersion to neutralize again the carboxyl group of the resin, whereby an aqueous dispersion of a colorant enclosing the color pigment with the resin (polymer) can be suitably obtained.

Also, as the forced emulsification method, a method of adding vinyl-based polymer having a silicone macromer as a copolymer component and a color pigment to an organic solvent and, after ionizing the salt-forming group in the vinyl-based polymer by adding a neutralizing agent to the solution or the dispersion obtained, adding thereto water to carry out emulsification is known. Then, by distilling off the organic solvent, a colorant enclosing the color pigment with the polymer can be suitably obtained.

Also, as the polymer enclosing the color pigment, there is, particularly, a copolymer of a dispersing agent having a polymerizable group described below and a copolymerizable monomer. The colorant enclosing a color pigment with the copolymer of the dispersing agent having a polymerizable group and the copolymerizable monomer can be suitably obtained by dispersing the color pigment in water with the dispersing agent having a polymerizable group, and thereafter carrying out a polymerization by adding the copolymerizable monomer and a polymerization initiator.

Since it is preferred for the ink for ink jet recording that the particle sizes are relatively uniform from the viewpoints of preventing the occurrence of clogging and the stability of ejection, it is preferred that the colorant enclosing a color pigment with the polymer is obtained by dispersing the color pigment with the dispersing agent having a polymerizable group and thereafter, carrying out the emulsion polymerization in water using a monomer copolymerizable with the dispersing agent (copolymerizable monomer) and a polymerization initiator.

For the emulsion polymerization, an ordinary method can be used, and the polymerization proceeds with the free radical generated by the thermal decomposition of a water-soluble polymerization initiator in the presence of an emulsifying agent.

It is preferred that the above-described copolymerizable monomer is a compound having an unsaturated group in its structure, and it is particularly preferred that the unsaturated group is selected from the group consisting of a vinyl group, an allyl group, an acryloyl group, a methacryloyl group, a propenyl group, an acrylamide group, a vinylamide group, a vinylidene group and a vinyl group.

More specifically, as the copolymerizable monomer, any compounds each having a high copolymerizing property with the dispersing agent having a polymerizable group can be used, and generally used radically polymerizable monomers can be used in the invention. Examples of the radically polymerizable monomer include monomers having in their molecule at least one unsaturated hydrocarbon group such as a vinyl group, an allyl group, an acryloyl group, a methacryloyl group, a propenyl group, an acrylamide group, a vinylamide group, a vinylidene group, a vinylene group, etc., which is a radically polymerizable group. Specific examples of the radically polymerizable monomer include styrene and styrene derivatives such as methylstyrene, dimethylstyrene, chlorostyrene, dichlorostyrene, bromostyrene, p-chlorostyrene, divinylbenzene, etc.; acrylic acid and monofunctional acrylic acid esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobonyl acrylate, 2-hydroxyethyl acrylate, 2-hydroxypropyl acrylate, 2-acryloyloxyethyl succinate, 2-acryloyloxyethyl phthalate, caprolactone acrylate, glycidyl acrylate, etc.; methacrylic acid and monofunctional methacrylic acid esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobonyl methacrylate, 2-hydroxyethyl methacrylate, 2-hydroxypropyl methacrylate, 2-hydroxybutyl methacrylate, glycerol methacrylate, 2-methacryloyloxyethyl succinate, 2-methacryloyloxyethyl phthalate, caprolactone methacrylate, glycidyl methacrylate, etc,; aminoethyl acrylate, aminopropyl acrylate, methylaminoethyl acrylate, methylaminopropyl acrylate, ethylaminoethyl acrylate, ethylaminopropyl acrylate, aminoethylamide acrylate, aminopropylamide acrylate, methylaminoethylamide acrylate, methylaminopropylamide acrylate, ethylaminoethylamide acrylate, ethylaminopropylamide acrylate, amide methacrylate, aminoethyl methacrylate, aminopropyl methacrylate, methylaminoethyl methacrylate, methylaminopropyl methacrylate, ethylaminoethyl methacrylate, ethylaminopropyl methacrylate, aminoethylamide methacrylate, aminopropylamide methacrylate, methylaminoethylamide methacrylamide, methylaminopropylamide methacrylamide, ethylaminoethylamide methacrylate, ethylaminopropylamide methacrylamide, hydroxymethyl acrylamide, hydroxymethyl methacrylate, N-methylolacrylamide; allyl compounds such as allyl alcohol, allylbenzene, allyl-3-cyclohexane propionate, 1-allyl-3,4-dimethoxybenzene, allylphenoxy acetate, allylphenyl acetate, allylcyclohexane, allyl polyhydric carboxylates, etc.; fumaric acid, maleic acid, itaconic acid and the esters of them; and monomers having a radically polymerizable group, such as acrylonitrile, methacrylonitrile, maleic anhydride, N-substituted maleimides, cyclic olefins, etc.

Particularly, as the copolymerizable monomer, monomers each having a hydrophilic group are preferably used. Examples of a monomer having a carboxyl group include, for example, acrylic acid, methacrylic acid, crotonic acid, ethacrylic acid, propylacrylic acid, isopropylacrylic acid, 2-acryloyloxyethylsuccinic acid, 2-acryloyloxyethylphthalic acid, 2-methacryloyloxyethylsuccinic acid, 2-methacryloyloxyethylphthalic acid, itaconic acid, fumaric acid, maleic acid, etc. Of these monomers, acrylic acid and methacrylic acid are preferred. Examples of a monomer having a sulfonic acid group include, for example, 4-styrenesulfonic acid and the salts thereof, vinylsulfonic acid and the salts thereof, sulfoethyl acrylate and the salts thereof, sulfoethyl methacrylate and the salts thereof, sulfoalkyl acrylates and the salts thereof, sulfoalkyl methacrylate and the salts thereof, sulfopropyl acrylate and the salts thereof, sulfopropyl methacrylate and the salts thereof, sulfoaryl acrylates and the salts thereof, sulfoaryl methacrylates and the salts thereof, butylacrylamidosulfonic acid and the salts thereof, and 2-acrylamido-2-methylpropanesulfonic acid and the salts thereof. Also, examples of a monomer having a hydroxyl group include, for example, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, polyethylene glycol 400 acrylate, polyethylene glycol 400 methacrylate, N-hydroxyethyl acrylate, and N-hydroxyethyl methacrylate. Examples of a monomer having an amide group include acrylamide, methacrylamide, aminopropylamide acrylate, aminopropylamide methacrylate, aminoethylamide acrylate, aminoethylamide methacrylate, vinylpyrrolidone, etc. Examples of a monomer having a phosphone group include phosphoethyl methacrylate, etc.

Since the polymerizable surface-active agent represented by formula (I) (described below in detail), which is preferred as the dispersing agent having a polymerizable group, is a monomer having a high electron donating property, a monomer having a high electron accepting property is preferred as the copolymerizable monomer to be used. Specific examples of the monomer having a high electron accepting property include fumaric acid diester compounds such as acrylonitrile, fumaronitrile, fumaric acid dibutyl ester, etc.; maleic acid diester compounds such as maleic acid dibutyl ester, etc.; maleimide compounds such as N-phenylmaleimide, etc.; and vinylidene cyanide, etc. They may be used singly or as a mixture of two or more thereof.

The addition amount of the polymerizable monomer is in the range of preferably from about 2 to 15 in terms of molar ratio, and more preferably from about 3 to 12 in terms of molar ratio with respect to the dispersing agent having a polymerizable group. When the addition amount thereof is at least 2 in terms of molar ratio, the capsulated pigment particles formed become excellent in the dispersion stability in an aqueous medium. Also, when the addition amount of not more than 15 in terms of molar ratio, the monomer can be sufficiently dissolved in the adsorbed layer of the dispersing agent having a polymerizable group, and generation of a water-insoluble polymer and relative reduction of the amount of an ionic repulsive group can be restrained, thereby the dispersion stability of the ink can be enhanced.

Suitable examples of the polymerization initiator for obtaining the copolymer of the dispersing agent having a polymerizable group and the copolymerizable monomer include potassium persulfate, ammonium persulfate, sodium persulfate, 2,2-azobis(2-methylpropionamidine) di-hydrochloride, and 4,4-azobis(4-cyanovaleric acid).

Also, in the emulsion polymerization, a chain-transfer agent can be used. Examples thereof include, for example, t-dodecylmercaptan, n-dodecylmercaptan, n-octylmercaptan, xanthogens such as dimethylxanthogen disulfide, diisobutylxanthogen disulfide, etc.; dipentene, indene, 1,4-cyclohexanediene, dihydrofuran, xanthene, etc.

As the dispersing method of the color pigment in water, dispersing methods such as a ultrasonic dispersion, and methods employing a beads mill, a sand mill, a roll mill, etc., can be used. Particularly, in the case of using a pigment, the use of a beads mill, a sand mill, a roll mill, etc., is preferred since it is possible to obtain fine particles of the colorant.

Also, as the above-described polymer enclosing a color pigment, a polymer having a crosslinked structure can be used.

The colorant enclosing a color pigment with a polymer having a crosslinked structure for use in the invention can be obtained by enclosing the color pigment by carrying out a phase inversion emulsification using a polymer having a crosslinking reactive group and a hydrophilic group, and further by carrying out a crosslinking reaction with a crosslinking agent.

In more detail, a mixed liquid obtained by adding a neutralizing agent and, optionally, a surface-active agent (As the surface-active agent, a polymerizable surface-active agent described in detail below is preferably used) to a solution or a dispersion obtained by adding a color pigment, a polymer having a crosslinking reactive group and a hydrophilic group to an organic solvent is used as a organic solvent phase. While stirring either of the organic solvent phase and water, water is added to the organic solvent phase or the organic solvent phase is added to water to thereby cause a phase inversion emulsification, and thus the color pigment is enclosed with the organic phase comprising the polymer having a crosslinking reactive group and a hydrophilic group and the crosslinking agent. Herein, the catalyst causing a crosslinking reaction may be added to either of the organic solvent phase and the aqueous phase, but it is preferred that when the catalyst is oil-soluble, the catalyst is added to the organic solvent phase, and when the catalyst is water-soluble, the catalyst is added to the aqueous phase.

Then, after carrying out the crosslinking reaction at a definite temperature, at which a crosslinking reaction is caused, for a definite time, the organic solvent is distilled off by a general method such as a distillation method, a vacuum distillation method, etc., whereby a dispersion wherein a colorant enclosing the color pigment with the polymer having a crosslinked structure is dispersed in the aqueous phase can be obtained.

The above-described polymer having a crosslinking reactive group and a hydrophilic group is not limited so long as it has at least a crosslinking reactive group and a hydrophilic group. Examples thereof include, for example, vinyl-based polymers, polyacrylic acid esters, styrene-acrylic acid copolymers, polyesters, polyamides, polyimides, polyurethanes, amino-based polymers, silicon-containing polymers, sulfur-containing polymers, fluorine-containing polymers, epoxy resins and mixtures thereof, which have a crosslinking reactive group and a hydrophilic group.

Examples of the hydrophilic group of the above-described polymer having a crosslinking reactive group and the hydrophilic group include a sulfone group, a sulfonic acid group, a carboxyl group, a hydroxyl group, the salts thereof, and quaternary ammonium salts, and it is preferred that the hydrophilic group is selected from these groups.

Examples of the crosslinking reactive group of the above-described polymer having the crosslinking reactive group and the hydrophilic group include a glycidyl group, a isocyanate group, a hydroxyl group, a carboxyl group and an unsaturated hydrocarbon group, and it is preferred that the crosslinking reactive group is selected from these groups.

Examples of the unsaturated hydrocarbon group of the above-described polymer having the crosslinking reactive group and the hydrophilic group include a vinyl group, an allyl group, an acryloyl group, a methacryloyl group, a propenyl group, a vinylidene group and a vinylene group, and it is preferred that the unsaturated hydrocarbon group is selected from these groups.

In a preferred embodiment of the invention, a vinyl-based polymer, a poly(meth)acrylic acid ester, or a styrene-(meth) acrylic acid copolymer is used as the polymer having a crosslinking reactive group and a hydrophilic group. Such a polymer can be obtained by carrying out a solution polymerization of: a (meth)acrylic acid ester monomer having at least one hydrophilic group selected from the group consisting of a sulfone group, a sulfonic acid group, a carboxyl group, a hydroxyl group, the salts thereof and a quaternary ammonium salt; a (meth)acrylic acid ester monomer having a crosslinking reactive group such as a glycidyl group, an isocyanate group, etc.; and a monomer copolymerizable with these monomers, in a solvent such as an aliphatic hydrocarbon-based solvent, an aromatic hydrocarbon-based solvent, an ester-based solvent, a ketone-based solvent, an alcohol-based solvent, an aprotic solvent, etc., in the presence of a polymerization initiator such as a peroxide, e.g., t-butylperoxy benzoate, di-t-butyl peroxide, cumene perhydroxide, acetyl peroxide, benzoyl peroxide, lauroyl peroxide, etc., or an azo compound, e.g., azobisisobutyronitrile, azobis-2,4-dimethylvaleronitrile, azobiscyclohexanecarbonitrile. Upon the solution polymerization, a polymerization chain transfer agent may be further added, and examples of the polymerization chain transfer agent include, for example, mercaptans such as octylmercaptan, n-dodecylmercaptan, t-dodecylmercaptan, n-hexadecylmercaptan, n-tetradecylmercaptan, t-tetradecylmercaptan, etc.; xanthogen disulfides such as dimethylxanthogen disulfide, diethylxanthogen disulfide, diisopropylxanthogen sulfide, etc.; thiuram disulfides such as tetramethylthiuram disulfide, tetraethylthiuram disulfide, tetrabutylthiuram disulfide, etc.; halogenated hydrocarbons such as carbon tetrachloride, ethylene bromide, etc.; hydrocarbons such as pentaphenylethane, etc; unsaturated cyclic hydrocarbons such as acrolein, methacrolein, allyl alcohol, 2-ethylhexyl thioglycolate, turbinorene, α-terpinene, γ-terpinene, dipentene, an α-methylstyrene dimer (Dimers containing at least 50 parts by weight of 2,4-diphenyl-4-methyl-1-pentene are preferred), 9,10-dihydroanthracene, 1,4-dihydronaphthalene, indene, 1,4-cyclohexadiene, etc.; and unsaturated heterocyclic compounds such as xanthene, 2,5-dihydrofuran, etc. They can be used singly or as a combination of two or more thereof.

The polymerization is usually carried out at a temperature of from 30 to 100° C., and preferably from 50 to 80° C. for from 1 to 10 hours, and the radical polymerization initiator used is appropriately selected according to the kinds of the radical polymerization initiator, monomers and solvent. Also, it is preferred that the polymerization is carried out under an inert gas atmosphere such as nitrogen, etc. After the polymerization, the copolymer formed can be isolated from the reaction liquid by a known method such as a re-precipitation, distilling off of solvent, etc. Also, the copolymer obtained can be purified by repeating the re-precipitation or by removing unreacted monomers by a membrane separation, a chromatographic method, an extraction method, etc. The weight average molecular weight of the polymer thus obtained is preferably from 1,000 to 50,000, and more preferably from 1,000 to 30,000 from the viewpoints of easiness of enclosing the coloring material and easiness of crosslinking.

The (meth)acrylic acid ester monomers having a hydrophilic group are as follows. That is, examples of acrylic monomers having a carboxylic group include, for example, acrylic acid, methacrylic acid, crotonic acid, ethacrylic acid, propylacrylic acid, isopropylacrylic acid, itaconic acid, fumaric acid, etc. Of these monomers, acrylic acid and methacrylic acid are preferred. Also, examples of (meth) acrylic monomers having a sulfonic acid group include, for example, sulfoethyl methacrylate, butylacrylamide sulfonic acid, 2-acrylamido-2-methylpropane sulfonate, etc. Examples of (meth)acrylic monomers having a phosphon group include, for example, phosphoethyl methacrylate, etc.

Examples of the (meth)acrylic acid ester monomer having a crosslinking reactive group include a polymerizable monomer having a block isocyanate group, a monomer having an epoxy group, a monomer having a 1,3-dioxolan-2-one-4-yl group, etc. The polymerizable monomer having a block isocyanate group can be easily obtained, for example, by addition-reacting a polymerizable monomer having an isocyanate group such as 2-methacryloyloxyethyl isocyanate with a known blocking agent. Also, the polymerizable monomer can be produced by addition-reacting a vinyl-based copolymer having a hydroxyl group and a carboxyl group with a compound having an isocyanate group and a block isocyanate group. Examples of the monomer having an epoxy group include, for example, glycidyl (meth) acrylate, a (meth)acrylate monomer having an alicyclic epoxy group, etc. Examples of the monomer having a 1,3-dioxolan-2-one-4-yl group include, for example, 1,3-dioxolan-2-one-4-ylmethyl (meth)acrylate, 1,3-dioxolan-2-one-4-ylmethyl vinyl ether, etc.

Examples of the monomer capable of copolymerizing with these monomers include the followings: for examples, (meth)acrylic acid esters such as methyl acrylate, ethyl acrylate, isopropyl acrylate, n-propyl acrylate, n-butyl acrylate, t-butyl acrylate, 2-ethylhexyl acrylate, n-octyl acrylate, lauryl acrylate, benzyl acrylate, methyl methacrylate, ethyl methacrylate, isopropyl methacrylate, n-propyl methacrylate, n-butyl methacrylate, isobutyl methacrylate, t-butyl methacrylate, 2-ethylhexyl methacrylate, n-octyl methacrylate, lauryl methacrylate, stearyl methacrylate, tridecyl methacrylate, benzyl methacrylate, etc.; the addition reaction products of an oil fatty acid and a (meth)acrylic acid ester monomer having an oxysilane structure such as the addition reaction product of stearic acid and glycidyl methacrylate, etc.; the addition reaction product of an oxysilane compound having an alkyl group having at least 3 carbon atoms and (meth)acrylic acid; styrene-based monomers such as styrene, α-methylstyrene, o-methylstyrene, m-methylstyrene, p-methylstyrene, p-tert-butylstyrene, etc.; itaconic acid esters such as benzyl itaconate, ethyl itaconate, etc.; maleic acid esters such as dimethyl maleate, diethyl maleate, etc.; fumaric acid esters such as dimethyl fumarate, diethyl fumarate, etc.; acrylonitrile, methacrylonitrile, vinyl acetate, isobonyl acrylate, isobonyl methacrylate, aminoethyl acrylate, aminopropyl acrylate, methylaminoethyl acrylate, methylaminopropyl acrylate, ethylaminoethyl acrylate, ethylaminopropyl acrylate, aminoethylamide acrylate, aminopropylamide acrylate, methylaminoethylamide acrylate, methylaminopropylamide acrylate, ethylaminoethylamide acrylate, ethylaminopropylamide acrylate, methacrylic amide, aminoethyl methacrylate, aminopropyl acrylate, methylaminoethyl methacrylate, methylaminopropyl methacrylate, ethylaminoethyl methacrylate, ethylaminopropyl methacrylate, aminoethylamide methacrylate, aminopropylamide methacrylate, methylaminoethylamide methacrylate, methylaminopropylamide methacrylate, ethylaminoethylamide methacrylate, ethylaminopropylamide methacrylate, hydroxymethyl acrylate, 2-hydroxyethyl methacrylate, 2-hydroxypropyl acrylate, hydroxymethyl methacrylate, 2-hydroxyethyl methacrylate, 2-hydroxypropyl methacrylate, N-methylolacrylamide, allyl alcohol, etc.

The crosslinking agent causes crosslinking by reacting with the crosslinking reactive group of the polymer having the crosslinking reactive group and the hydrophilic group, and crosslinking agents having in their molecular structures at least two functional groups that react with the above-described crosslinking reactive group of the polymer are used. When the above-described crosslinking reactive group of the polymer is a glycidyl group, it is preferred to use a compound having at least two functional groups, the functional groups being at lease one member selected from the group consisting of an amino group, a carboxyl group, a hydroxyl group, an N-methylol group and an N-methylol ether group. Examples thereof include, for example, aliphatic amines such as ethylene amines N-aminoethylpiperazine, methaxylenediamine, 1,3-bis (aminomethyl)cyclohexane, polyamide, etc.; cyclic aliphatic amines such as paramethanediamine, mesophoronediamine, bis(4-amino-3-methylcyclohexyl)methane, 2-ethyl-4-methylimidazole, etc.; aromatic amines such as methaphenylenediamine, 4,4'-diamino-diphenylamine, 4,4'-diaminodiphenylsulfone, dicyandiamide, etc.; and acid anhydrides such as phthalic anhydride, pyromellitic anhydride, nadic anhydride, etc. When the crosslinking reactive group of the polymer having the crosslinking reactive group and the hydrophilic group is an isocyanate group, it is preferred to use a compound having at least two functional groups, the functional groups being at least one member selected from the group consisting of a carboxyl group, a hydroxyl group, an amino group and a mercapto group. Examples thereof include, for example, polyols such as polyether polyol, polytetramethylene ether glycol, an alkylene oxide copolymer polyol, epoxy resin-modified polyols, a lactone-based polyester polyol, condensed-series polyester polyols, polycarbonate diols, acrylic polyols, polybutadiene polyols, phosphorus-containing polyols, halogen-containing polyols, etc.; polyamines such as polyether polyamine, polytetramethylene ether diamine, alkylene oxide copolymer polyamine, epoxy-modified polyamines, condensed-series polyester polyamines, polycarbonate polyamine, acrylic polyamine, etc.; and polythiols such as polyether polythiol, polytetramethylene ether dithiol, alkylene oxide copolymer polythiol, epoxy resin-modified polythiols, lactone-based polyester polythiols, condensed-series polyester polythiols, polycarbonate dithiol, acrylic polythiol, polybutadiene polythiol, phosphorus-containing polythiols, halogen-containing polythiols, etc. When the crosslinking reactive group of the above-described polymer is a hydroxyl group, it is preferred to use a compound having at least two functional groups, the functional groups being at least one member selected from the group consisting of a glycidyl group and an isocyanate group. When the crosslinking reactive group of the above-described polymer is an unsaturated hydrocarbon group, it is preferred to use a compound having at least two unsaturated hydrocarbon groups, the unsaturated hydrocarbon groups being at least one member selected from the group consisting of a vinyl group, an allyl group, an acryloyl group, a methacryloyl group, a propenyl group, a vinylidene group and a vinylene group. Examples thereof include, for example, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis (acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxy.diethoxy) phenylzpropane, 2,2-bis[4-(acryloxyethoxy-polyethoxy)phenyl]propane, hydroxypivalic acid neopentyl glycol diacrylate, 1,4-butanediol diacrylate, dicyclopentanyl diacrylate, dipentaerythritol hexa-acrylate, dipentaerythritol monohydroxy pentaacrylate, ditrimethylolpropane tetra-acrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexane diol dimethacrylate, neopentyl glycol dimethacrylate, 2-hydroxy-1,3-dimethacryloxypropane, 2,2-bis[4-(methacryloxy)phenyl] propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexa-methacrylate, glycerol dimethacrylate, hydroxypivalic acid neopentyl glycol dimethacrylate, dipentaerythritol monohydroxy pentamethacrylate, ditrimethylolpropane tetra-methacrylate, pentaerythritol methacrylate, pentaerythritol tetra-methacrylate, triglycerol dimethacrylate, trimethylolpropane trimethacrylate, tris(methacryloxyethyl) isocyanurate, divinylbenzene, diallyl phthalate, diallyl terephthalate, diallyl isophthalate, diethylene glycol bisallyl carbonate, etc.

It is preferred that the above-described crosslinking agent is added to the organic solvent phase in the range of from 0.01 to 0.1 by weight ratio based on the weight of the polymer having the crosslinking reactive group and the hydrophilic group. Weight ratios less than 0.01 cause increase of the viscosity in a long period of time, clogging of nozzle, inferior ejecting stability, etc., and are not preferred. On the other hand, weight ratios exceeding 0.1 cause deterioration of the abrasion resistance, increase of particle sizes, etc., and are not preferred.

As the catalyst used for the crosslinking reaction, any compounds having an effect of causing or accelerating the reaction can be used. When the above-described crosslinking reactive group of the polymer is the unsaturated hydrocarbon group and a compound having at least two unsaturated hydrocarbon groups of at least one member selected from a vinyl group, an allyl group, an acryloyl group, a methacryloyl group, a propenyl group, a vinylidene group and a vinylene group is used as the crosslinking agent, there can be used as the catalyst any of: oil-soluble radical polymerization initiators including peroxides such as t-butylperoxy benzoate, di-t-butyl peroxide, cumene perhydroxide, acetyl peroxide, benzoyl peroxide, lauroyl peroxide, etc., and azo compounds such as azobisisobutyronitrile, azobis-2,4-dimethylvaleronitrile, azobiscyclohexanecarbonitrile, etc.; and water-soluble radical polymerization initiators such as potassium persulfate, ammonium persulfate, sodium persulfate, 2,2-azobis(2-methylpropion amidine) dihydrochloride, 4,4-azobis(4-cyanovaleric acid), etc. In addition, the addition amount of the catalyst is appropriately determined.

There is no particular restriction on the organic solvent used for the organic solvent phase, so long as it dissolves at least the above-described polymer having the crosslinking reactive group and the hydrophilic group. Organic solvents having low boiling points are preferred by taking into consideration of the easiness of distilling off of the organic solvent. Examples of the organic solvent include, for example, ketone-based organic solvents such as acetone, methyl ethyl ketone, etc.; ester-based organic solvents such as ethyl acetate, etc.; alcohol-based organic solvents such as ethanol, isopropyl alcohol, etc.; and aromatic hydrocarbon-based organic solvents such as benzene, etc.

The addition amount of the polymer having the crosslinking reactive group and the hydrophilic group is appropriately determined in the range of from 0.3 to 1.5 by weight ratio with respect to the color pigment, and it is preferred to determine by adjusting such that the mean particle size of the colorant becomes not larger than 400 nm, preferably not larger than 200 nm, and also the amounts of water-soluble substances in the aqueous phase after the production originated from the polymer having the crosslinking reactive group and hydrophilic group become not more than 1,000 ppm.

Examples of a method of preparing a mixed liquid containing at least "the polymer having the crosslinking reactive group and hydrophilic group", "the crosslinking agent" and "the color pigment" in an organic solvent include: a method of dispersing the color pigment in an organic solvent phase having dissolved therein the above-described polymer having the crosslinking reactive group and hydrophilic group using various dispersing means such as a beads mill, a roll mill, a sand mill, etc., and then dissolving therein the crosslinking agent and optionally an oil-soluble catalyst; and a method of dispersing by flashing the color pigment in the state of being dispersed in water. (for example, a wet cake of the color pigment) in the polymer having the crosslinking reactive group and hydrophilic group by various dispersing means and then dissolving or dispersing the crosslinking agent and optionally an oil-soluble catalyst. For the purpose of increasing the dispersibility of the color pigment, a dispersing agent or a surface-active agent is generally used. However, in the invention, a reactive surface-active agent is preferably used. Incidentally, the reactive surface-active agent referred to herein is the same as the polymerizable surface-active agent described below. As the reactive surface-active agent, a surface-active agent that can react with the polymer having the crosslinking reactive group and hydrophilic group or with the crosslinking agent is used. The use of the reactive surface-active agent improves deterioration of printed images such as the generation of bleeding on a plain paper and an ejection defect caused by wetting of the nozzle periphery of a printer head, which are liable to occur with an ink composition using a colorant produced by using generally used dispersing agent and surface agent.

In addition, for fining the colorant obtained, it is preferred to carry out the phase inverse emulsification while applying ultrasonic waves.

Also, other preferred embodiment of the polymer having a crosslinked structure is a polymer having a crosslinked structure constituted by a copolymer of a dispersing agent having at least a polymerizable group and a crosslinkable monomer.

The above-described polymer having a crosslinked structure includes, as a matter of course, a polymer obtained by copolymerizing a,dispersing agent having a polymerizable group, a crosslinkable monomer, and a monomer copolymerizable with the crosslinkable monomer.

The colorant enclosing a color pigment with the polymer having the crosslinked structure constituted by the copolymer of the dispersing agent having at least a polymerizable group and a crosslinkable monomer means encapsulated particles of the color pigment in a fine, stable and complete state.

The colorant enclosing a color pigment with the polymer having the crosslinked structure constituted by the copolymer of the dispersing agent having a polymerizable group and a crosslinkable monomer is excellent in the dispersion stability in an aqueous medium comprising a water-soluble organic solvent and water and has good dispersion stability therein. The reason has not yet been clarified but it is considered to be caused by that the enclosing polymer is more strongly fixed to the coloring material as compared with the case where a dispersing agent is adsorbed to the surfaces of the particles of the coloring material simply by a van der Waals force, and that since the enclosing polymer has a crosslinked structure, the solvent resistance of the colorant is improved. In addition, the above-described theoretical concept is used for only explaining the content of the invention and the scope of the invention is not limited thereby.

As the crosslinkable monomer for use in the invention, any monomer having a high copolymerizing property with the dispersing agent having a polymerizable group can be used.

As the crosslinkable monomer for use in the invention, a compound having at least two unsaturated hydrocarbon groups, the unsaturated hydrocarbon groups being at least one member selected from a vinyl group, an allyl group, an acryloyl group, a methacryloyl group, a propenyl group, a vinylidene group and a vinylene group, is preferably used. Examples thereof include, for example, ethylene glycol diacrylate, diethylene glycol diacrylate, triethylene glycol diacrylate, tetraethylene glycol diacrylate, polyethylene glycol diacrylate, allyl acrylate, bis(acryloxyethyl) hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]-propane, 2,2-bis[4-(acryloxyethoxy)phenyl]propane, 2,2-bis[4-(acryloxyethoxy-diethoxy)phenyl]propane, 2,2-bis[4-(acryloxyethoxy.polyethoxy)phenyl]propane, hydroxypivalic acid neopentyl glycol diacrylate, 1,4-butanediol diacrylate, dicyclopentanyl diacrylate, dipentaerythritol hexa-acrylate, dipentaerythritol monohydroxy pentaacrylate, ditrimethylolpropane tetra-acrylate, pentaerythritol triacrylate, tetrabromobisphenol A diacrylate, triglycerol diacrylate, trimethylolpropane triacrylate, tris (acryloxyethyl) isocyanurate, ethylene glycol dimethacrylate, diethylene glycol diacrylate, triethylene glycol diacrylate, tetraethylene glycol dimethacrylate, polyethylene glycol dimethacrylate, propylene glycol diacrylate, polypropylene glycol diacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis(4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexa-methacrylate, glycerol dimethacrylate, hydroxypivalic acid neopentyl glycol dimethacrylate, dipentaerythritol monohydroxy pentamethacrylate, ditrimethylolpropane tetra-methacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, diethylene glycol bisallyl carbonate, etc.

The addition amount of the above-described crosslinkable monomer is in the range of preferably from 0.1 to 20% by weight, and more preferably from 0.1 to 10% by weight to the weight of the polymer obtained. Addition amounts less than 0.1% by weight cause increase of the viscosity in a long period of time, clogging of nozzle, inferior ejecting stability, etc., and hence are not preferred. On the other hand, addition amounts exceeding 20% by weight make it hard to obtain the desired colorant, and hence are not preferred.

In the invention, as the monomer copolymerizable with the dispersing agent having a polymerizable group and with the crosslinkable monomer, a generally used radically polymerizable monomer can be used. Examples of the radically polymerizable monomer include monomers each having in the molecule thereof at least one unsaturated hydrocarbon group such as a vinyl group, an allyl group, an acryloyl group, a methacryloyl group, a propenyl group, a vinylidene group, a vinylene group, etc., which are radically polymerizable groups. Specific examples of the radically polymerizable monomer include styrene and styrene derivatives such as methylstyrene, dimethylstyrene, chlorostyrene, dichlorostyrene, bromostyrene, p-chloromethylstyrene, divinylbenzene, etc.; acrylic acid and monofunctional acrylic acid esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, cyclopentenyl acrylate, dicyclopentenyloxyethyl acrylate, tetrahydrofurfuryl acrylate, isobonyl acrylate, 2-hydroxyethyl acrylate, 2-hydroxypropyl acrylate, 2-acryloyloxyethyl succinate, 2-acryloyloxyethyl phthalate, caprolactone acrylate, glycidyl acrylate, etc.; methacrylic acid and monofunctional methacrylic acid esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobonyl methacrylate, 2-hydroxyethyl methacrylate, 2-hydroxypropyl methacrylate, 2-hydroxybutyl methacrylate, glycerol methacrylate, 2-methacryloyloxyethyl succinate, 2-methacryloyloxyethyl phthalate, caprolactone methacrylate, glycidyl methacrylate, etc.; allyl compounds such as allylbenzene, allyl-3-cyclohexane propionate, 1-allyl-3,4-dimethoxybenzene, allylphenoxy acetate, allylphenyl acetate, allylcyclohexane, allyl polyhydric carboxylate, etc.; fumaric acid, maleic acid, itaconic acid, and the esters of these acids; and monomers having a radically polymerizable-group, such as acrylonitrile, methacrylonitrile, maleic anhydride, N-substituted maleimide, cyclic olefins, etc.

Since the polymerizable surface-active agent represented by formula (I) (described below in detail), which is the preferred dispersing agent having a polymerizable group, is a monomer having a high electron donating property, a monomer having a high electron accepting property is preferred as the monomer to be used. Specific examples of the monomer having a high electron accepting property include acrylonitrile, fumaronitrile, fumaric acid diesters, such as fumaric acid dibutyl ester, etc.; maleic acid diesters such as maleic acid dibutyl ester, etc.; maleimides such as N-phenylmaleimide, etc.; and vinylidene cyanide. They may be used singly or as a mixture of them.

The addition amount of the monomer is in the range of preferably from about 2 to 15 in terms of molar ratio, and more preferably from 3 to 12 in terms of molar ratio with respect to the amount of the dispersing agent having a polymerizable group. When the addition amount of the monomer is at least 2 in terms of molar ratio, the colorant (encapsulated coloring material particles) becomes excellent in the dispersion stability in an aqueous dispersion. Also, when the addition amount is not more than 15 in terms of molar ratio, the monomer can be sufficiently dissolved in the adsorbed layer of the dispersing agent having a polymerizable group, and the generation of water-insoluble polymer and the relative reduction of the amount of an ionic repulsive group can be restrained, whereby the dispersing stability of the ink composition can be increased.

The colorant enclosing a color pigment with the polymer having a crosslinked structure constituted by the dispersing agent having a polymerizable group, the crosslinkable monomer, and the monomer copolymerizable with these monomers can be produced as follows.

That is, the color pigment and the dispersing agent having a polymerizable group are added to an aqueous organic solvent and/or water. After wet grinding the color pigment by a dispersing means such as ultrasonic waves, a ball mill, a sand grinder, etc., the mixture is transferred to a reaction vessel equipped with a ultrasonic wave generator, a stirrer, a dropping funnel, a reflux condenser and a temperature controller, and the crosslinkable monomer, other copolymerizable monomers, a polymerization initiator, and, if necessary, water and/or an aqueous organic solvent are added thereto followed by carrying out the polymerization reaction at a temperature of from 40 to 100° C. for from 10 to 60 hours, whereby a colorant enclosing the color pigment with the polymer having a crosslinked structure can be obtained. The addition amount of the polymerization initiator is preferably from 0.1 to 5% by weight, and more preferably from 0.1 to 3% by weight with respect to the total amounts of the dispersing agent having a polymerizable group and the monomer copolymerizable with the crosslinkable monomer. More preferably, the colorant can be produced in accordance with the production method described in Japanese Patent Laid-Open No. 316909/1998.

As the polymerization initiator for obtaining the polymer having a crosslinked structure, a water-soluble polymerization initiator such as potassium persulfate, sodium persulfate, ammonium persulfate, 2,2-azobis(2-methylpropionamidine) dihydrochloride, 4,4-azobis(4-cyanovaleric acid), etc., is suitably used.

The "dispersing agent having a polymerizable group" described above is not limited so long as it has at least a polymerizable group, a hydrophobic group and a hydrophilic group in its molecular structure, and particularly, suitable examples thereof include polymerizable surface-active agents having at least a polymerizable group, a hydrophobic group and a hydrophilic group in their molecular structures (surface-active agents having introduced therein a polymerizable group) and polymeric dispersing agents having at least a polymerizable group, a hydrophobic group and a hydrophilic group in their molecular structures (polymeric dispersing agents having introduced therein a polymerizable group).

As the polymerizable group, a functional group that causes a polymerization reaction such as a radical polymerization, a polyaddition, a polycondensation, etc., may be used. Examples of the radically polymerizable group include unsaturated hydrocarbon groups such as a vinyl group, an allyl group, an acryloyl group, a methacryloyl group, a vinylidene group, a vinylene group, etc. Examples of the polyaddition reactive group include an isocyanate group, a isothiocyanate group and, as groups reactive with these groups, a hydroxy group, an amino group, a mercapto group, a carboxyl group, etc. The polycondensation reactive group is a functional group capable of causing a condensation reaction, and examples thereof include a carboxyl group, a hydroxyl group, an amino group, an alkoxy group, etc.

As the polymerizable group, an unsaturated hydrocarbon group, which is a radically polymerizable group, is preferred and it is preferred that such an unsaturated hydrocarbon group is selected from the group consisting of a vinyl group, an allyl group, an acryloyl group, a methacryloyl group, a propenyl group, a vinylidene group, and a vinylene group.

Also, it is preferred that the hydrophilic group is selected from the group consisting of a carboxy group, a carbonyl group, a hydroxyl group, a sulfone group, a sulfonic acid group and the salts of them, and quaternary ammonium salts.

As the polymeric dispersing agent having introduced therein a polymerizable group, the following synthetic polymers each having introduced therein a polymerizable group can be used. Specific examples of the synthetic polymer include polyvinyl alcohols; polyvinyl pyrrolidones; acrylic resins such as polyacrylic acid, an acrylic acid-acrylonitrile copolymer, a potassium acrylate-acrylonitrile copolymer, a vinyl acetate-an acrylic acid ester copolymer, an acrylic acid-acrylic acid ester copolymer, etc., and the salts thereof; styrene-acrylic resins, such as styrene-acrylic resins such as a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, etc., and the salts thereof; vinyl acetate-based copolymers such as a styrene-maleic acid copolymer, a styrene-maleic anhydride copolymer, a vinylnaphthalene-acrylic acid copolymer, a vinylnaphthalene-maleic acid copolymer and the salts thereof; and a vinyl acetate-ethylene copolymer, vinyl acetate-fatty acid vinylethylene copolymer, a vinyl acetate-maleic acid ester copolymer, a vinyl acetate-crotonic acid copolymer, a vinyl acetate-acrylic acid copolymer and the salts thereof. Of these polymers, the copolymer of a monomer having a hydrophobic group and a monomer having a hydrophilic group and the polymer made of a monomer having a hydrophobic group and a hydrophilic group in combination in its molecular structure are particularly preferred.

In the invention, as a preferred embodiment, a polymerizable surface-active agent is used as the dispersing agent having a polymerizable group.

In the polymerizable surface-active agent used in the invention, it is preferred that the hydrophilic group thereof is selected from the group consisting of a sulfone group, a sulfonic acid group, a carboxyl group, a carbonyl group, a hydroxyl group, the salts thereof and quaternary ammonium salts, and it is preferred that the polymerizable group thereof is an unsaturated hydrocarbon group, and more specifically, the polymerizable group is selected from the group consisting of a vinyl group, an allyl group, an acryloyl group, a methacryloyl group, a propenyl group, a vinylidene group, and a vinylene group. Specific examples of the polymerizable surface-active agent include the anionic allyl derivatives as described in Japanese Patent Publication Nos. 46291/1974 and 24142/1989, and Japanese Patent Laid-Open No.104802/1987; the anionic propenyl derivatives as describe-in Japanese Patent Laid-Open No. 221431/1987; the anionic acrylic acid derivatives as described in Japanese Patent Laid-Open Nos. 34947/1987 and 11525/1980; the anionic itaconic acid derivatives as described in Japanese Patent Publication No. 34898/1981 and Japanese Patent Laid-Open No. 30284/1976; the anionic maleic acid derivatives as described in Japanese Patent Publication No. 4257/1976 and Japanese Patent Laid-Open No. 30284/1976; the nonionic allyl derivatives as described in Japanese Patent Laid-Open No. 104802/1987; the nonionic propenyl derivatives as described in Japanese Patent Laid-Open No. 100502/1987; the nonionic acrylic acid derivatives as described in Japanese Patent Laid-Open No. 28208/1981; the nonionic itaconic acid derivatives as described in Japanese Patent Publication No. 12681/1984; the nonionic maleic acid derivatives as described in Japanese Patent Laid-Open No. 74102/1984; and the cationic allyl derivatives as described in Japanese Patent Publication No. 65824/1992.

Since the polymerizable surface-active agent adsorbs onto the surfaces of color pigment particles and is excellent in the dispersion stability (that is, the aggregation of particles each other can be prevented) under the polymerization condition thereafter, the polymerizable surface-active agent is useful in the point of easily forming encapsulated particles.

In the invention, as the polymerizable surface-active agent, the compound represented by formula (I) or formula (II) described below is preferred. By using the polymerizable surface-active agent represented by formula (I) or formula (II), "the colorant enclosing a color pigment with a polymer" can be stably dispersed in an aqueous medium as fine and stable encapsulated particles. Since the polymerizable surface-active agent represented by formula (I) or formula (II) is particularly excellent in the adsorbing property to the surfaces of color pigment particles and the dispersion stability (that is, the aggregation of particles each other can be prevented) under the polymerization condition thereafter, the polymerizable surface-active agent is useful in the point of easily forming encapsulated particles. Also, the polymerizable surface-active agent represented by formula (I) is disclosed in Japanese Patent Laid-Open Nos. 320276/1993 and .316909/1998.

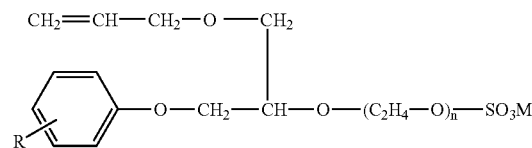

(I)

In the above formula, R represents a hydrogen atom or a hydrocarbon group having from 1 to 12 carbon atoms; n represents a number of from 2 to 20; and M represents an alkali metal, an ammonium salt, or an alkanolamine.

By appropriately adjusting the kind of R and the value of N in formula (I), the surface-active agent can correspond to the extent of the hydrophilic property or hydrophobic property on the surface of the coloring material. Examples of preferred polymerizable surface-active agents represented by formula (I) include, specifically, compounds represented by following formulae (III) to (IV). They may be used singly or as a mixture thereof.

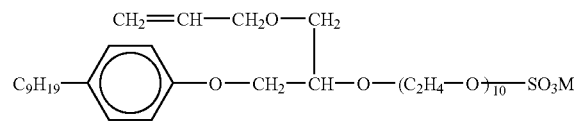

(III)

M = NH$_4$

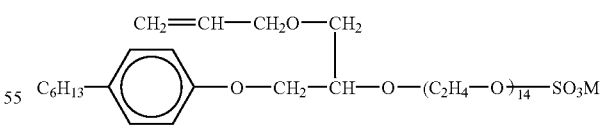

(IV)

M = Na

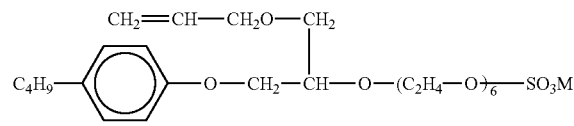

(V)

M = NH(C$_2$H$_4$OH)$_3$

-continued

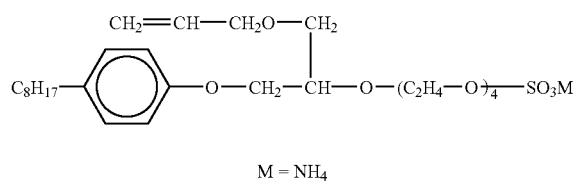

(VI)

M = NH$_4$

As the polymerizable surface-active agent represented by formula (I), commercially available products can be used. For example, SE-10N of Adekarea Soap SE Series manufactured by ASAHI DENKA KOGYO K.K. is a polymerizable surface-active agent of formula (I) wherein R is C$_9$H$_{19}$, n is 10 and M is NH$_4$, which corresponds to formula (III). Also, SE-20N of the same series is the same as SE-10N, but n is 20.

Also, the polymerizable surface-active agent represented by formula (II) is as follows.

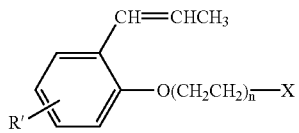

(II)

X; —SO$_3$M, —H

In the above formula, R' represents a hydrogen atom or a hydrocarbon group having from 1 to 12 carbon atoms; n represents a number of from 2 to 20: and M represents an alkali metal, an ammonium salt, or an alkanolamine.

In addition, R' is preferably C$_9$H$_{19}$— or C$_8$H$_{17}$—.

As the polymerizable surface-active agent, other commercially available products than those described above can be also used. For example, examples thereof include Aquaron HS Series (Aquaron HS-05, HS-10, HS-20, and HS-1025), Aquaron RN Series (RN-10, RN-20, RN-30, RN-50, and RN-2025), New Frontier Series (New Frontier 177E. and S-510), manufactured by DAIICHI PURE CHEMICAL CO., LTD.; Adekarea Soap NE Series (NE-10, NE-20, NE-30, NE-40, and NE-50).

The addition amount of the polymerizable surface-active agent is in the range of preferably from about 10 to 150% by weight and more preferably from about 20 to 100% by weight with respect to the amount of the color pigment. When the addition amount thereof is at least 10% by weight, the dispersion stability of the ink composition can be improved.

On the other hand, when the addition amount thereof is not more than 150% by weight, the generation of the polymerizable surface-active agent non-adsorbed to the color pigment can be restrained, and the generation of the polymer other than the encapsulated particles can be prevented, thereby the ejection stability of the ink composition can be improved.

Also, examples of the colorant enclosing a pigment with a polymer further include the encapsulated fine pigment particles as described in Japanese Patent Publication No. 94634/1995 or Japanese Patent Laid-Open No. 59715/1996, the pigment the surface of which is bonded with a polymer as described in WO9951690, and the modified particles bonded with a polymer group having a halogen group as described in U.S. Pat. No. 6,103,380.

The content of the "colorant enclosing a color pigment with a polymer" described above in detail in a color ink is preferably from 0.3% by weight to 30% by weight, and particularly preferably from 1.0% by weight to 12% by weight. When the addition amount is less than 0.5% by weight, the printing density is hard to be ensured and also when the addition amount is more than 30% by weight, the density of the ink is increased and the structural viscosity occurs in the viscosity characteristics, thereby the ejection stability tends to become inferior.

In the ink set of the invention, it is preferred that at least one ink (hereinafter, sometimes referred to as simply "ink") selected from the group consisting of the black ink and the color inks contains at least one water-soluble organic solvent selected from the group consisting of acetylene glycol-based surface-active agents, acetylene alcohol-based surface-active agents, glycol ether compounds, 1,2-alkylene glycols, and the compounds represented by formula (1), whereby the occurrences of bleeding and uneven printing in the case of using plain papers and ink jet recording papers are reduced, and the printing quality is improved.

$$RO-(EP)_n-M \quad (1)$$

Wherein R is a group which is selected from the group consisting of an alkyl group, a cycloalkyl group, a phenylalkyl group and an aryl group and which has from 4 to 10 carbon atoms. For example, the aryl group having from 4 to 10 carbon atoms include a phenyl group or a naphthyl group. When the carbon atom number is 3 or less, the permeability is hard to obtain, and when the carbon atom numbers exceeds 10, the molecular weight becomes large and there is a problem that the viscosity of the system is liable to be increased.

Also, particularly, in the case of employing a head ejecting an ink using a electrostrictive element and applying a water-repellent treatment to the front surface of a nozzle, when the carbon atom numbers exceeds 10, the ejection is liable to become unstable. Accordingly, the group represented by R has from 4 to 10 carbon atoms, but preferably from 4 to 8. The symbol O represents an oxygen atom and EP represents the repeating of ethyleneoxy and/or propylene oxy. The symbol n represents a mean value in the molecule and is from 1 to 30. When n exceeds 30, particularly, in the case of repeating of ethyleneoxy, the generation of bubbles becomes large and the ink for ink jet recording becomes hard to be used. On the other hand, when-n exceeds 30, since the average molecular weight becomes large, the effect of improving the quality of the print is lowered regardless of the addition amount, and on the contrary, there is a trouble that the viscosity is increased. Therefore, n is preferably not larger than 30. The symbol M represents a hydrogen atom, a sulfonate, a phosphonate or a borate group. Other than hydrogen, the salt represented by M can be used as the alkali metal salt such as the sodium salt, the potassium salt, the lithium salt, etc.; the ammonium salt; the alkanolamine salt such as the triethanolamine salt, tripropanolamine salt, etc.

Particularly, in the ink set of the invention, it is preferred that the ink contains at least one surface-active agent selected from the group consisting of an acetylene glycol-based surface-active agent and an acetylene alcohol-based surface-active agent and at least one compound selected from the group consisting of glycol ether compounds, 1,2-alkylene glycols, and the compounds represented by formula (1), whereby particularly, the printing quality can be improved.

Herein, it is preferred that the above-described water-soluble organic solvent is so constructed that the solvent becomes from 0.5% by weight to 30% by weight with respect to the whole amount of the ink. When the amount of the solvent is less than 0.5% by weight, the effect of improving the permeability becomes insufficient and the printing quality is hardly improved. On the other hand, when the amount exceeds 30% by weight, the ink becomes difficult to be used by the increase of the viscosity, and also there is a tendency that the effect of further improving the printing quality is not acknowledged by the addition of further larger amount. More preferably, the amount is from 1% by weight to 15% by weight.

Further, it is preferred that the ink contains the at least one surface-active agent selected from the group consisting of the acetylene glycol-based surface-active agents and the acetylene alcohol-based surface-active agents in an amount of not more than 5% by weight. When the content thereof exceeds 5% by weight, the effect of improving the printing quality have peaked and the addition even causes an increase of the viscosity, thereby making the use of the ink hard, the ink liable to attach to the tip of the head, and the print liable to be disturbed. The addition amount is more preferably from 0.1% by weight to 2% by weight.

In addition, in another preferred embodiment of the invention, the ink contains the at least one surface-active agent selected from the group consisting of the acetylene glycol-based surface-active agents and the acetylene alcohol-based surface-active agents in an amount of not more than 0.5% by weight and also contains the at least one compound selected from the group consisting of glycol ether compounds, 1,2-alkylene glycols and the compounds represented by the above-described formula (1) in an amount of at least 1% by weight.

The acetylene glycol-based surface-active agent and the acetylene alcohol-based surface-active agent have an effect of improving the permeability by a small amount thereof. In the case of containing the at least one surface-active agent selected from the group consisting of the acetylene glycol-based surface-active agents and the acetylene alcohol-based surface-active agents in the ink in an amount of not more than 0.5% by weight for the above reason, it is preferred that the at least one compound selected from the group consisting of glycol ether compounds, 1,2-alkylene glycols and the compounds represented by the above-described formula (1) is contained in the ink in an amount of at least 1% by weight from the viewpoint of improving the printing quality.

In addition, when the ink contains the at least one surface-active agent selected from the group consisting of the acetylene glycol-based surface-active agents and the acetylene alcohol-based surface-active agents in an amount of at least 0.5% by weight, it is preferred that the weight ratio of said surface-active agent and the glycol ether compound is from 1:0 to 1:10 from the viewpoint of the printing quality. When the addition amount of the glycol ether compound exceeds 10 times the amount of the acetylene glycol-based surface-active agent and/or the acetylene alcohol-based surface-active agent, not only the effect of improving the printing quality tends to have peaked, but also, on the contrary, an adverse effect of increasing the viscosity of the ink becomes liable to occur.

In addition, when the ink contains the at least one surface-active agent selected from the group consisting of the acetylene glycol-based surface-active agents and the acetylene alcohol-based surface-active agents in an amount of at least 0.5% by weight, it is preferred that the weight ratio of said surface-active agent and the 1,2-alkylene glycol is from 1:0 to 1:10 from the viewpoint of the printing quality. When the addition amount of the 1,2-alkylene glycol exceeds 10 times the amount of the acetylene glycol-based surface-active agent and/or the acetylene alcohol-based surface-active agent, not only the effect of improving the printing quality tends to have peaked, but also, on the contrary, an adverse effect of increasing the viscosity of the ink becomes liable to occur.

In addition, when the ink contains the at least one surface-active agent selected from the group consisting of the acetylene glycol-based surface-active agents and the acetylene alcohol-based surface-active agents in an amount of at least 0.5% by weight, it is preferred that the weight ratio of said surface-active agent and the compound represented by formula (1) is from 1:0 to 1:10 from the viewpoint of the printing quality. When the addition amount of the compound represented by formula (1) exceeds 10 times the amount of the acetylene glycol-based surface-active agent and/or the acetylene alcohol-based surface-active agent, not only the effect of improving the printing quality tends to have peaked, but also, on the contrary, an adverse effect of increasing the viscosity of the ink becomes liable to occur.

Particularly, in the ink set of the invention, it is preferred that all of the black ink and the at least one color ink each contains at least one surface-active agent selected from the group consisting of the acetylene glycol-based surface-active agents and the acetylene alcohol-based surface-active agents, and that among the content of the above-described surface-active agent with respect to the amount of the black ink and the contents of the above-described surface-active agents with respect to the respective whole amount of the color inks, the ratio of the maximum value to the minimum value is from 1.00 to 1.80. According to this constitution, bleeding scarcely occurs in the images obtained.

As the at least one surface-active agent selected from the group consisting of the acetylene glycol-based surface-active agents and the acetylene alcohol-based surface-active agents, suitable examples thereof include at least one compound selected from the group consisting of 2,4-dimethyl-5-hexyne-3-ol, 2,4,7,9-tetramethyl-5-decyne-4,7-diol, 3,6-dimethyl-4-octyne-3,6-diol, and adducts of said 2,4-dimethyl-5-hexyne-3-ol, 2,4,7,9-tetramethyl-5-decyne-4,7-diol and 3,6-dimethyl-4-octyne-3,6-diol each added with not more than 30, on average number, of an ethyleneoxy group and/or a propyleneoxy group, from the viewpoint of improving the printing quality.

With regard to the adducts of 2,4-dimethyl-5-hexyne-3-ol, 2,4,7,9-tetramethyl-5-decyne-4,7-diol and 3,6-dimethyl-4-octyne-3,6-diol with ethyleneoxy groups and/or propyleneoxy groups, when the addition number of the ethyleneoxy groups and/or propyleneoxy groups exceeds 30, on average number, bubbling of the ink becomes severe and the effect of improving the printing quality tends to become lower. Therefore, not more than 30 is preferred.

Examples of the glycol ether compounds include diethylene glycol mono (alkyl having from 1 to 8 carbon atoms) ether, triethylene glycol mono (alkyl having from 1 to 8 carbon atoms) ether, propylene glycol mono (alkyl having from 1 to 6 carbon atoms) ether, and dipropylene glycol mono (alkyl having from 1 to 6 carbon atoms) ether, and they can be used singly or as a mixture of two or more thereof.

Specific examples thereof include ethylene glycol monomethyl ether, ethylene glycol monoethyl ether, ethylene glycol mono-iso-propyl ether, ethylene glycol monobutyl ether, ethylene glycol mono-t-butyl ether, ethylene glycol monomethyl ether acetate, diethylene glycol monomethyl ether (DEGmME), diethylene glycol monoethyl ether (DEGmEE), diethylene glycol monopropyl ether (DEGmPE), diethylene glycol mono-iso-propyl ether, diethylene glycol monobutyl ether (DEGmBE), diethylene glycol mono-t-butyl ether, diethylene glycol monopentyl ether (DEGmPeE), diethylene glycol monohexyl ether (DEGmHE), diethylene glycol monoheptyl ether (DEGmHpE), diethylene glycol monooctyl ether (DEGmOE), triethylene glycol monomethyl ether (TEGmME), triethylene glycol monoethyl ether (TEGmEE), triethylene glycol monopropyl ether (TEGmPE), triethylene glycol monobutyl ether (TEGmBE), triethylene glycol monopentyl ether (TEGmPeE), triethylene glycol monohexyl ether (TEGmHE), triethylene glycol monoheptyl ether (TEGmHpE), triethylene glycol monooctyl ether (TRGmOE), propylene glycol monomethyl ether (PGEmME), propylene glycol monoethyl ether (PGmEE), propylene glycol monopropyl ether (PGmPE), propylene glycol-iso-propyl ether, propylene glycol monobutyl ether (PGmBE), propylene glycol mono-t-butyl ether, propylene glycol monopentyl ether (PGmPeE), propylene glycol monohexyl ether (PGmHE), dipropylene glycol monomethyl ether (DPGmME), dipropylene glycol monoethyl ether (DPGmEE), dipropylene glycol monopropyl ether (DPGmPE), dipropylene glycol mono-iso-propyl ether, dipropylene glycol monobutyl ether (DPGmBE), dipropylene glycol monopentyl ether (DPGmPeE), dipropylene glycol monohexyl ether (DPGmHE), etc. However, since the hydrophobic property becomes higher with a larger alkyl group, methyl, ethyl, propyl and butyl are suitable for improving the printing quality in the case of using a plain paper.

Particularly, as the glycol ether compounds, di(tri)ethylene glycol monobutyl ether and/or (di)propylene glycol monobutyl ether is preferred.

Herein, the "(di)propylene glycol monobutyl ether" means propylene glycol monobutyl ether (PGmBE) and/or dipropylene glycol monobutyl ether (DPGmBE) Also, the "di(tri)ethylene glycol monobutyl ether" means diethylene glycol monobutyl ether (DEGmBE) and/or triethylene glycol monobutyl ether (TEGmBE).

For obtaining a suitable permeability as the ink for ink jet recording, it is preferred that the (di)propylene glycol monobutyl ether is contained in the ink in an amount of not more than 10% by weight. When the amount exceeds 10% by weight, not only the effect of improving the printing quality becomes to have peaked, but also, on the contrary, an adverse effect of increasing the viscosity of the ink becomes liable to occur. In addition, since the water-solubility of the (di)propylene glycol monobutyl ether is not so high, when the addition amount thereof in the ink exceeds 10% by weight, the addition of a dissolution aid becomes liable to be necessary. The addition amount is more preferably from 0.5% by weight to 5% by weight.

In addition, for obtaining a suitable permeability as the ink for ink jet recording, it is preferred that the di(tri)ethylene glycol monobutyl ether is contained in the ink in an amount of not more than 20% by weight. When the amount exceeds 20% by weight, not only the effect of improving the printing quality becomes to have peaked, but also, on the contrary, an adverse effect of increasing the viscosity of the ink becomes liable to occur. The addition amount thereof is more preferably from 0.5% by weight to 10% by weight.

Particularly, in the ink set of the invention, it is preferred that all of the black ink and the at least one color ink each contains the glycol ether compound and that among the content of the glycol ether compound with respect to the whole amount of the black ink and the contents of the glycol ether compounds with respect to the respective whole amount of the color inks, the ratio of the maximum value to the minimum value is from 1.00 to 1.80. According to this constitution, bleeding scarcely occurs in the images obtained.

For obtaining a suitable permeability as the ink for ink jet recording, it is preferred that the 1,2-alkylene glycol having from 4 to 10 carbon atoms is contain in an amount of not more than 10% by weight with respect to the whole amount of the ink. Of the 1,2-alkylene glycols, 1,2-alkylene glycols having not more than 3 carbon atoms give a low effect of improving the permeability. On the other hand, since 1,2-alkylene glycols having more than 10 carbon atoms have a low water solubility, they are hardly used in the water-soluble ink as of the invention, it becomes necessary to introduce a structure added with an oxyethylene chain or a water-soluble group such as a sulfonic acid group, a phosphoric acid group, etc. Incidentally, provided that the number of carbon atoms is 4 or more, 1,2-alkylene glycol derivatives having introduced therein the above-described water-soluble group and having a carbon atom number of not more than 30 can be suitably used in the invention.

Examples of the 1,2-alkylene glycol for use in the invention include 1,2-butanediol (1,2-BD), 1,2-pentanediol (1,2-PeD), 1,2-hexanediol (1,2-HD), 1,2-octanediol, etc. 1,2-alkylene glycol that gives a large effect by being used as it is includes 1,2-pentanediol and/or 1,2-hexanediol.

Particularly, in the ink set of the invention, it is preferred that all of the black ink and the at least one color ink each contains the 1,2-alkylene glycol and that among the content of the 1,2-alkylene glycol with respect to the whole amount of the black ink and the contents of the 1,2-alkylene glycols with respect to the respective whole amount of the color inks, the ratio of the maximum value to the minimum value is from 1.00 to 1.80. According to this constitution, bleeding scarcely occurs in the images obtained.

Also, in the ink set of the invention, it is preferred that the compound represented by the above-described formula (1) is contained in the ink in an amount of not more than 10% by weight. When the amount exceeds 10% by weight, not only the effect of improving the printing quality becomes to have peaked, but also, on the contrary, an adverse effect of increasing the viscosity of the ink becomes liable to occur. The addition amount is more preferably from 0.5% by weight to 7% by weight.

Also, in a suitable embodiment of the invention, the ink further contains a saccharide and/or glycerol. In particular, since the combined use of glycerol and a saccharide which are water-soluble and have a water-holding effect enhances the effect of restraining the evaporation of water, the viscosity increase and solidification of the ink due to drying at the tip portion of the nozzle of a head can be prevented. Therefore, clogging of the nozzle with the ink can be surely prevented (the reliability against clogging can be improved) and good ejection stability can be ensured for a long period of time.

Examples of the saccharide for use in the invention include monosaccharides, oligosaccharides, polysaccharides and glycosides.

In this case, examples of the saccharide include monosaccharides, oligosaccharides, polysaccharides and glycosides, and there are aldehyde types, ketone types, and sugar alcohol types. Specific examples thereof include erythrose, threose, erythrulose, erythritol, arabinose, xylose, ribulose, xylulose, xylitol, glucose, mannose, galactose, talose, fructose, psicose, tagatose, sorbose, sorbitol, mannitol, trehalose, kojibiose, nigrose, maltose, isomaltose, isotrehalose, soforose, laminaribiose, cellobiose, gentiobiose, multidextrin, straight chain oligosaccharide, isomaltooligosaccharide, isomerized saccharides, gentioligosaccharide, polydextrose, multitol, fructooligosaccharide, paratinose, paratinose oligosaccharide, emulsified oligosaccharide, lactitol, lactulose, galactooligosaccharide, soybean oligosaccharide, xylooligosaccharide, chitin-chitosan oligosaccharide, pectin oligosaccharide, agarooliogosaccharide, inulooligosaccharide, paranichit, reduced starch syrup, karaginan, alginic acid, pullulan, xanthane gum, gellan gum, cardlan, polydextrose, etc. Of these saccharides, since saccharides having a larger molecular weight has a higher viscosity and thus the addition amount is restrained, monosaccharides and disaccharides having a relatively small molecular weight are preferred. When the addition amount of polysaccharides is increased, the viscosity of the ink is increased, thus not being preferred.

Accordingly, it is preferred that at least 80% by weight of the saccharides comprises aldose, ketose, and/or sugar alcohol each having not more than 12 carbon atoms.

Particularly preferred examples of the saccharides for use in the invention include glucose, mannose, multitol, fructose, ribose, xylose, arabinose, lactose, galactose, aldonic acid, glucitose, maltose, cellobiose, sucrose, trehalose, erythritol, maltotriose, isomaltooligosaccharide, mannitol, sorbitol, fructose, and xylitol. The addition amount of the above-described saccharide for use in the invention is preferably at least 0.05% by weight and not more than 30% by weight, and more preferably from 3% by weight to 20% by weight. When the addition amount is less than 0.05% by weight, the effect of recovering from the phenomenon that the ink is dried at the tip portion of the nozzle of a head to clog the nozzle, i.e., a so-called clogging phenomenon, is small. When the addition amount exceeds 30% by weight, the viscosity of the ink is increased to cause a problem in the ejection stability, such as the occurrence of an ejection defect, etc., thus not being preferred.

In addition, it is preferred that the black ink of the ink set of the invention contains polymer fine particles, thereby the abrasion resistance of obtained images can be improved. In the invention, the "polymer fine particles" mean fine particles of a polymer component, which preferably comprises a polymer having a film-forming property.

Also, the "aqueous emulsion" described below means an aqueous dispersion wherein the continuous phase comprises water and the dispersed particles comprise polymer fine particles. The "aqueous emulsion" is sometimes referred to a polymer emulsion or a resin emulsion. Specific examples of the polymer component constituting the polymer fine particles include an acrylic resin, a vinyl acetate-based resin, a styrene-butadiene-based resin, a vinyl chloride-based resin, an acryl-styrene-based resin, a butadiene resin, a styrene-based resin, a crosslinked acrylic resin, a crosslinked styrene resin, a benzoguanamine resin, a phenol resin, a silicone resin, a methacrylic acid resin, a urethane resin, an acrylamide resin, an epoxy resin, and the mixtures of them. As for these polymers, there is no particular restriction on the form of copolymerization and they may exist in the form of, for example, a black copolymer, a random copolymer, etc.

The polymer fine particles containing a polymer comprising an acrylic acid ester and/or a methacrylic acid ester as the main component are preferred.

Among the polymers enumerated above, the polymer fine particles preferably have a film-forming property. Herein, the "film-forming property" means that a polymer film is formed when the polymer fine particles are dispersed in water to form an aqueous emulsion and the water component of the aqueous emulsion is evaporated off. The ink added with the polymer fine particles has the property that a polymer film is similarly formed when the solvent component of the ink is evaporated off. The polymer film formed has a function of strongly fixing the colorant component to the surface of a recording medium. It is considered that thereby images excellent in the abrasion resistance and the water resistance can be realized.

The polymer fine particles have preferably a lowest film-forming temperature of lower than room temperature, more preferably lower than 30° C., and most preferably a lowest film-forming temperature of lower than 10° C. This is because the polymer fine particles have a film-forming property but it is preferred that the film-formation is carried out at a temperature of not higher than room temperature. Herein, the "lowest film-forming temperature" means the lowest temperature at which a transparent continuous film is formed in the case of thinly casting a polymer emulsion, obtained by dispersing the polymer fine particles in water, on a metal plate such as an aluminum plate and raising the temperature. In the temperature region lower than the lowest film-forming temperature, the resulting product becomes a white powdery form. It is more preferred that the glass transition point of the polymer fine particles is 30° C. or lower.

The polymer fine particles preferably have a structure originated from an unsaturated vinyl monomer having a carboxyl group and a structure formed by crosslinking of a crosslinkable monomer having at least two polymerizable double bonds. Such polymer fine particles, upon the polymerization thereof, constitute a three-dimensional crosslinked structure by copolymerizing with a crosslinkable monomer having at least two, more preferably at least three, polymerizable double bonds.

As the polymer fine particles, the particles of a single particle structure can be used. On the other hand, the polymer fine particles having a core-shell structure comprising a core portion and a shell portion surrounding the core portion can be also utilized. In the specification, the "core-shell structure" means the "form where two or more kinds of polymers each having a different composition exist in the particle in the state of phase separation". Accordingly, the core-shell structure may be not only a form that the shell portion completely covers the core portion but also a form that the shell portion covers a part of the core portion. In addition, the core-shell structure may be that a part of the polymer of the shell portion forms a domain, etc., in the core particle. Furthermore, the core-shell structure may be a multilayer structure of at least three layers including at least one layer having a different composition between the core portion and the shell portion. The polymer fine particles having the core-shell structure undergo coalescence each other by the reduction of water and the water-soluble organic solvent, and deformed by the pressure accompanied by the film-formation. It is considered that by such a property, the reactive functional groups existing in the core portion and the shell portion are bonded to each other to form a network structure. Thereby, the merit that a stronger and large film can be formed is obtained. The property of forming a network structure by coexisting reactive functional groups in the polymer fine particles is referred to as a "self-crosslinking property" in the present specification.

The polymer fine particles can be obtained by a known emulsion polymerization. That is, the polymer fine particles can be obtained by emulsion polymerizing an unsaturated vinyl monomer in water in the presence of a polymerization catalyst and an emulsifying agent.

Examples of the unsaturated vinyl monomer include acrylic acid ester monomers, methacrylic acid ester monomers, aromatic vinyl monomers, vinyl ester monomers, vinyl cyan compound monomers, halogenated monomers, olefin monomers, and diene monomers. Specific examples thereof include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, etc.; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, etc.; vinyl esters such as vinyl acetate, etc.; vinyl cyan compounds such as acrylonitrile, methacrylonitrile, etc.; halogenated monomers such as vinylidene chloride, vinyl chloride, etc.; aromatic vinyl monomers such as styrene, 2-methylstyrene, vinyltoluene, t-butylstyrene, chlorostyrene, vinylanisole, vinylnaphthalene, etc.; olefins such as ethylene, propylene, isopropylene, etc.; dienes such as butadiene, chloroprene, etc.; and vinyl monomers such as vinyl ether, vinyl ketone, vinylpyrrolidone, etc. With respect to a monomer having no carboxyl group, it becomes inevitable to utilize an unsaturated vinyl monomer having a carboxyl group, and preferred specific examples thereof include acrylic acid, methacrylic acid, itaconic acid, fumaric acid, and maleic acid, and the utilization of methacrylic acid. In addition, examples of usable emulsifying agent include anionic surface-active agents, nonionic surface-active agents and mixtures thereof.

Further examples of the unsaturated vinyl monomer include, in addition to styrene, tetrahydrofurfuryl acrylate and butyl methacrylate, monofunctional monomers such as ($\alpha$, 2, 3, or 4)-alkylstyrene, ($\alpha$, 2, 3, or 4)-alkoxystyrene, 3,4-dimethylstyrene, $\alpha$-phenylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl' (meth)acrylate, ethyl (meth)acrylate, propyl (meth)acrylate, ethylhexyl (meth)acrylate, other alkyl (meth)acrylates, methoxydiethylene glycol (meth)acrylate, the (meth) acrylate of diethylene glycol or polyethylene glycol of an ethoxy group, a propoxy group or a butoxy group, cyclohexyl (meth)acrylate, benzyl (meth)acrylate, phenoxyethyl (meth)acrylate, isobonyl (meth)acrylate, hydroxyalkyl (meth)acrylate, other fluorine-containing, chlorine-containing or silicon-containing (meth)acrylate, (meth) acrylamide, maleic acid amide; and in the case of introducing a crosslinked structure in addition to mono-function, e.g., introduction of (meth)acrylic acid, etc., examples thereof also include compounds having an acrylic group or a methacrylic group, such as (mono, di, tri, tetra, or poly) ethylene glycol di(meth)acrylate, the (meth)acrylates of 1,4-butanediol, 1,5-pentanediol, 1,6-hexanediol, 1,8-octanediol, and 1,10-decanediol; trimethylolpropane tri (meth)acrylate, glycerol (di, or tri)(meth)acrylate, the di(meth)acrylate of the ethylene oxide addition product of bisphenol A or bisphenol F, neopentyl glycol di(meth) acrylate, pentaerythritol tetra(meth)acrylate, dipentaerythritol hexa(meth)acrylate, etc.

Furthermore, in addition to the above-described monomer, by adding acrylamide compounds or hydroxyl group-containing monomers, the printing stability can be further improved. Specific examples of the acrylamide compound include acrylamide and N,N'-dimethylacrylamide. In addition, specific examples of the hydroxyl group-containing monomer include 2-hydroxyethyl acrylate, 2-hydroxypropyl acrylate, 2-hydroxyethyl methacrylate, and 2-hydroxypropyl methacrylate. They can be used singly or as a mixture of two or more thereof.

As the emulsifying agent, active agents of a phosphate or a sulfate, anionic surface-active agents, nonionic surface-active agents, and amphoteric surface-active agents, etc., can be used as well as sodium laurylsulfate and potassium laurylsulfate, and active agents which are sulfates of an alkyl group having a stearyl group, nonyl group, octyl group, etc., sulfates of a branched alkyl group, or sulfates of an alkylphenyl group.

Further, the polymer fine particles of the core-shell structure are generally produced by an emulsion polymerization of a multistage, etc., using a known method. For example, the polymer fine particles can be produced by the method disclosed in Japanese Patent Laid-Open No. 76004/1992. Specific examples of the unsaturated vinyl monomer used for the polymerization include those illustrated above.

As the polymer fine particles, those containing a structure originated from a sulfonic acid group and/or salt thereof in the polymer structure are preferably used. As such polymer fine particles, those having the structure originated from a sulfonic acid group and/or salt thereof and a structure crosslinked with a crosslinkable monomer having at least two polymerizable double bonds are preferred. The structure originated from a sulfonic acid group and/or salt thereof can be introduced by using a monomer having a sulfonic acid group as the copolymer component. Specific examples of the monomer having a sulfonic acid group include vinylsulfonic acid and salts thereof, styrenesulfonic acid and salts thereof, and 2-(meth)acryloylamino-2-methylpropanesulfonic acid and salts thereof.

In addition, a polymerization initiating agent, a surface-active agent, a molecular weight controlling agent (chain transfer agent) and a neutralizing agent, which are usually used in an emulsion polymerization, can be used in the invention in accordance with an ordinary method.

As the polymerization initiator, as well as potassium persulfate and ammonium persulfate, a general initiator used for a radical polymerization, such as hydrogen persulfate, azobisisobutylonitrile, benzoyl peroxide, dibutyl peroxide, peracetic acid, cumene hydroperoxide, t-butyl hydroperoxide, para-methane hydroxyperoxide, etc., can be used. Since the polymerization reaction is carried out in water, the polymerization initiator is preferably water-soluble.

As the chain transfer agent for the polymerization, as well as t-dodecylmercaptan, general chain transfer agents such as n-dodecylmercaptan, n-octylmercaptane, xanthogens (such as dimethylxanthogen sulfide, diisobutylxanthogen sulfide, etc), dipentene, indene, 1,4-cyclohexadiene, dihydrofuran, xanthene, etc., can be used.

Further, although the examples of a double phase using the core-shell type polymer fine particles wherein the structure of the core is different from the structure of the shell are shown above, the case of a single phase prepared by one shot may be used in the present invention. However, it is preferred that the film-forming temperature (MFT) of these polymer fine particles is set to a temperature of not higher than room temperature or the film-forming temperature is lowered than room temperature using a MFT lowering agent. In addition, depending on the reaction conditions, etc., the above-described additive may be not used. For example, when a micelle-forming monomer is used, a micelle-forming agent becomes unnecessary, and depending on the reaction conditions, there is a case that a chain transfer agent may be not used. Therefore, they can be appropriately selected.

The polymer fine particles may be mixed with other component of the black ink as fine particle powder, but it is preferred that the polymer fine particles are dispersed in an aqueous medium to form a polymer emulsion, and thereafter the polymer emulsion is mixed with other component of the black ink. The content of the polymer fine particles in the black ink is preferably from about 0.1 to 10% by weight, and more preferably from about 0.1 to 5% by weight. The molecular weight of the polymer fine particles is preferably at least 10,000 and more preferably at least 100,000.

The particle sizes of the polymer fine particles are preferably from about 10 to 400 nm, and more preferably from about 50 to 200 nm.

It is preferred that the polymer fine particles have a hydrophilic group on the surfaces thereof. Herein, as the hydrophilic group, a sulfonic acid group and salts thereof are preferred.

Particularly, it is preferred that the polymer fine particles have a film-forming property, have a hydrophilic group (particularly, a sulfonic group and salts thereof) on the surfaces thereof, and have the particle sizes of from 50 to 200 nm.

Further, the inks of the invention can contain various additives such as a wetting agent, a moisture-holding agent, a dissolution aid, a penetration controlling agent, a viscosity controlling agent, a pH controlling agent, an antioxidant, an antifungal substance, an antiseptic, a metal ion trapping agent, etc., for the purposes of ensuring the storage stability, preventing the occurrence of clogging, ensuring the ejection stability, and ensuring the shelf stability.

For restraining drying of the ink at the tip portion of a nozzle of a head, it is preferred to add the following water-soluble organic solvent having a water-solubility and a water-holding effect as a wetting agent (or moisture-holding agent), and examples thereof include glycerol, ethylene glycol, diethylene glycol, triethylene glycol, polyethylene glycol having a molecular weight of not larger than 2000, propylene glycol, dipropylene glycol, 1,3-propylene glycol, isopropylene glycol, isobutylene glycol, 1,4-butanediol, 1,3-butanediol, 1,5-pentanediol, 1,6-hexanediol, mesoerythritol, pentaerythritol, etc. In the invention, glycerol, ethylene glycol, diethylene glycol, and polyethylene glycol having a molecular weight of not larger than 2000 are particularly preferably used.

As the antiseptic, at least one compound selected from the group consisting of alkylisothiazolone, chloroalkylisothiazolone, benzisothiazolone, bromonitroalcohol, oxazolidine-based compounds and chloroxylenol is preferred.

Specific examples of the antiseptic are as follows. For example, as the alkylisothiazolone, products containing octylisothiazolone as the effective component are commercially available (for example, NS-800H, NS-800G, and NS-800p, manufactured by Nagase Kasei Kogyo K.K.). As the chloroalkylisothiazolone, products containing chloroisomethylthiazolone as the effective component are commercially available (for example, NS-500W, NS-80D, NS-CG, NS-TM, and NS-RS, manufactured by Nagase Kasei Kogyo K.K.). Products containing benzisothiazolone as the effective component are commercially available (for example, Proxel XL-2, Proxel BDN, Proxel BD20, Proxel GXL, Proxel LV, and Proxel TN, manufactured by Zeneca Ltd. (England); Deniside BIT and Deniside NIPA, manufactured by Nagase Kasei Kogyo K.K.). Products containing bromonitroalcohol as the effective component are commercially available (for example, Bronopole, Miaside BT, and Miaside AS, manufactured by Nagase Kasei Kogyo K.K.). Also, a product containing chloroxylenol as the effective component is commercially available (for example, PCMX: manufactured by Nagase Kasei Kogyo K.K.). Also, products containing oxazolidine-based compound as the effective component are commercially available (for example, NS-BP, Deniside BIT-20N, Deniside SPB, Saniset HP, Microstat S520, Saniset SK2, Deniside NS-100, Deniside C3H, Saniset 161, Deniside CSA, Deniside CST, Deniside C3, Deniside OMP, Deniside XR-6, Deniside NM, Mordenise N769, Denisat P4, Denisat P-8, and Denisat CHR, manufactured by Nagase Kasei Kogyo K.K.). Of these products, the products containing the oxazolidine-based compound as the effective component, the products containing chloroisomethylthiazolone as the effective component, and the products containing benzisothiazolone as the effective component have a large effect.

Also, these antiseptics are more preferably composite components using two or more kinds of structures, which do not so resemble each other, than a single component since the former can restrain resistant bacteria.

As the metal ion trapping agent, ethylenediamine tetraacetate is preferred and as a rust preventive, dicyclohexyl ammonium nitrate and/or benzotriazole is preferably used. Examples of the ethylenediamine tetraacetate include ethylenediaminetetraacetic acid di-sodium salt, ethylenediaminetetraacetic acid tri-sodium salt, ethylenediaminetetraacetic acid tetra-sodium salt, ethylenediaminetetraacetic acid di-potassium salt, ethylenediaminetetraacetic acid tri-potassium salt, ethylenediaminetetraacetic acid tetra-potassium salt, ethylenediaminetetraacetic acid di-ammonium salt, ethylenediaminetetraacetic acid tri-ammonium salt, ethylenediaminetetraacetic acid tetra-ammonium salt, etc., but particularly, ethylenediaminetetraacetic acid di-sodium salt and ethylenediaminetetraacetic acid di-potassium salt are preferably used.

The ethylenediamine tetraacetate has an effect of restraining deterioration of the dispersion stability of the colorant by the influence of a very small amount of a metal ion existing in the ink passageway within the cartridge or the head.

As the rust preventive, dicyclohexyl ammonium nitrate and/or benzotriazole are effective. The rust preventive is for preventing the metal head from being rusted and is effective for a plated surface which is liable to be rusted (particularly, the tip portion of the nozzle is liable to be rusted, whereby an the ejection of an ink is liable to become inferior.).

Moreover, as components for improving the solubility of ink components, further improving the permeability of the ink to a recording medium such as papers, or preventing clogging of a nozzle, there are alkyl alcohols having from 1 to 4 carbon atoms, such as ethanol, methanol, butanol, propanol, isopropanol, etc.; formamide, acetamide, dimethyl sulfoxide, sorbitol, sorbitan, acetin, diacetin, triacetin, sulfolan, etc., and they can be appropriately selected and used.

Also, the ink can contain other surface-active agents for controlling the permeability. As the additional surface-active agent, a surface-active agent having a good compatibility with the inks of the invention is preferred and, of surface-active agents, those having a high permeability and good stability are preferred. Examples thereof include amphoteric surface-active agents, nonionic surface-active agents, etc. Examples of the amphoteric surface-active agent include lauryldimethylaminoacetic acid betain, 2-alkyl-N-carboxymethyl-N-hydroxyethyl imidazolinium betain, coconut oil fatty acid amide propyldimethylaminoacetic acid betain, polyoctyl polyaminoethylglycine, and also imidazoline derivatives, etc. Examples of the nonionic surface-active agent include ether-based surface-active agents such as polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, polyoxyalkylene alkyl ether, etc.; polyoxyethylene oleic acid; ester-based surface-active agents such as polyoxyethylene oleic acid ester, polyoxyethylene distearic acid ester, sorbitan laurate, sorbitan monostearate, sorbitan monooleate, sorbitan sesquioleate, polyoxyethylene monooleate, polyoxyethylene stearate, etc.; and also fluorine-based surface-active agents such as fluorine alkyl esters, perfluoroalkyl carboxylates, etc.

Also, as a pH controlling agent, a dissolution aid, and an antioxidant, there are amines such as diethanolamine, triethanolamine, propanolamine, tri-isopropanolamine, morpholine, and the denatured products thereof; inorganic salts such as potassium hydroxide, sodium hydroxide, lithium hydroxide, etc.; ammonium hydroxide, quaternary ammonium hydroxides (tetramethylammonium, etc.); carbonates such as ammonium carbonate, sodium carbonate, lithium carbonate, etc.; phosphates; N-methyl-2-pyrrolidone; ureas such as urea, thiourea, tetramethylurea, etc.; allophanates such as allophanate, methyl allophanate, etc.; biurets such as biuret, dimethylbiuret, tetramethylbiuret, etc.; L-ascorbic acid and the salts thereof. Also, commercially available antioxidants and surface-active agents can be used. Examples thereof include Tinuvin 328, 900, 1130, 384, 292, 123, 144, 622, and 770; Irgacor 252 and 153; Irganox 1010, 1076, 1035, MD1024, etc., manufactured by Ciba-Geigy Corporation; and include the oxides of lanthanide, sodium benzoate, etc.

Furthermore, examples of the viscosity-controlling agent include rosins, alginic acids, polyvinyl alcohol, hydroxypropyl cellulose, carboxymethyl cellulose, hydroxyethyl cellulose, methyl cellulose, polyacrylates, polyvinyl pyrrolidone, gum arabic starch, etc.

In addition, the surface tension of the ink is preferably not higher than 45 mN/m, and more preferably in the range of from 25 to 45 mN/m. When the surface tension exceeds 45 mN/m, good printed images are hard to obtain because the drying property of the printed images becomes bad, bleeding is liable to occur, a color bleed occurs, etc. On the other hand, when the surface tension is less than 25 mN/m, the periphery of the nozzle of a printer head becomes liable to be wetted, whereby a problem is liable to occur in the ejection stability, such as curving of ejected ink droplets. The above-described surface tension can be measured by a surface tension meter usually used.

The surface tension of the ink can be controlled in the above-described range by adjusting the kinds and composition ratio of the components constituting the ink.

While the constitutions of the inks of the ink set of the invention have been explained above, the ink set of ink jet recording of the invention comprises a black ink and at least one color ink, and the color inks are usually constituted by a combination of at least three color inks each having a different color. For example, suitable examples of the ink set include an ink set comprising four inks including a black ink, a magenta ink, a yellow ink and a cyan ink, and an ink set comprising seven inks including each two kinds of tints for each of the magenta ink, the yellow ink and the cyan ink. Furthermore, these constructions can be further combined with an orange ink and a green ink.

Also, by the ink set for ink get recording of the invention as described above, images having a high printed density can be obtained and an ink set having a wide color reproducing range can be obtained.

Also, since pigments are used for the colorants in the inks in the invention, the images formed are excellent in the weather resistance (light resistance and gas resistance). Particularly, as for the color inks, since the color pigment is enclosed with the polymer, the weather resistance is very high. Also, in regard to the color inks, since the characteristic of the polymer enclosing a pigment can be designed with a high freedom by selecting the polymerizable monomers and other reactants, various functions (a light resistance, a gas resistance, a coloring property, luster, a fixing property, etc.) can be imparted to the color inks.

Since in an ink obtained by dispersing a pigment with a general dispersing agent (a surface-active agent, a polymeric dispersing agent, etc.), the dispersing agent is fundamentally in a state of merely adsorbing onto the pigment, the dispersing agent is liable to be released off from the pigment by some environmental factors. Because of such a released dispersing agent, the viscosity of the ink is liable to be unnecessary increased. Therefore, usually, the addition amount of the colorant is limited and, for this reason, it is considered to be difficult to attain sufficient color development of images. However, with the "carbon black dispersible in an aqueous medium without a dispersing agent" and the "colorant enclosing a color pigment with a polymer" for use in the ink set of the invention, there is no need of using the above-described dispersing agent, and the polymer enclosing a color pigment is hardly released off from the pigment. Therefore, even when the colorant is added at a higher addition amount, the viscosity of the ink is not increased and can be easily lowered. Thus, the addition amount of the colorant can be increased as compared with an ink prepared by dispersing a pigment with a general dispersing agent. Accordingly, images having sufficient color development can be easily obtained.

Also, the ink jet recording process of the invention has a feature of using the ink set for ink jet recording of the invention. Herein, the ink jet recording process can be suitably carried out by preparing an ink cartridge with the ink set of the invention, mounting the ink cartridge on a known ink jet recording apparatus, performing printing onto a recording medium.

Herein, as the ink cartridge (storage case) for storing the inks for ink jet recording, a known ink cartridge can be used.

Also, as one embodiment of the ink jet recording process of the invention, there is an embodiment that the ink set of ink jet recording has a magenta ink, a cyan ink and a yellow ink as the color inks, and text printing is carried out by using a composite black, which is formed by combining the magenta ink, the cyan ink and the yellow ink, together with a black ink of the ink set for ink jet recording. Thereby, a text print having a high printed density and being excellent in the abrasion resistance can be obtained.

Herein, in the case of carrying out text printing onto a recording medium for ink jet recording (a recording medium having formed on the surface an ink-receiving layer for receiving inks for ink jet recording), particular, it is preferred to incorporate the polymer fine particles in the black ink because the text print having a high print density and being excellent in the abrasion resistance can be surely obtained.

In this embodiment of the recording process, it is preferred to use the composite black and the black ink at the weight ratio of from 20:80 to 65:35, thereby the text print having a high print density and being excellent in the abrasion resistance can be more surely obtained.

In addition, since the recorded matter of the invention is printed by the recording process of the invention, it has images formed over a wide color reproducing range.

EXAMPLES

Then, specific modes for carrying out the invention will be illustrated below.

Preparation of Pigment Particles (Colorant 1-1 to Colorant 1-4) Dispersible in an Aqueous Medium without a Dispersing Agent The "introduced mount of a hydrophilic group on the surface of pigment particles" was obtained by the following method.
Determination of the Introduced Amount of Hydrophilic Group:

The Case of Introducing a Hydrophilic Group with a Sulfonating Agent

Pigment particles the surfaces of which were treated with a sulfonating agent were treated with an oxygen flask combustion method. After absorbing with an aqueous solution of 0.3% hydrogen peroxide, a sulfate ion (divalent) was determined by an ion chromatograph method (Dionex Co.; 2000i). The value obtained was converted to a sulfonic acid group, and the converted value was shown as the equivalent per gram of the pigment.

The Case of Introducing a Hydrophilic Group with a Carboxylating Agent

As a method, a Zeisel method is used. Diazomethane is dissolved in a proper solvent and, by adding it dropwise, active hydrogens on the surfaces of pigment articles are all converted to a methyl group. To the pigment thus treated is added hydriodic acid having a specific gravity of 1.7 followed by heating, thereby methyl group is vaporized as methyl iodide. The vapor of methyl iodide is trapped with a silver nitrate solution to precipitate as methylsilver iodide. Based on the weight of silver iodide, the amount of the original methyl group, that is, the amount of the active hydrogen is measured.

Colorant 1-1: Black

A mixture of 15 parts of carbon black ("MA-7", manufactured by Mitsubishi Chemical Corporation) and 200 parts of sulfolan was dispersed for one hour by an Eiger Motor Mill M Type 250 (manufactured by EIGER JAPAN K.K.) under the conditions of a beads packing ratio of 70% and rotation number of 5000 rpm. A mixture of the pigment paste thus dispersed and a solvent was transferred to an evaporator, and was heated to 120° C. while reducing the pressure to 30 mmHg or lower. After distilling off water contained in the system as completely as possible, the temperature was controlled to 150° C. Then, 25 parts of sulfur trioxide was added thereto, the reaction was carried out for 6 hours. After the completion of the reaction, the product was washed several times with an excessive amount of sulfolan, followed by pouring into water and filtering, to obtain colorant 1-1 (carbon black particles having a hydrophilic group on the surfaces thereof).

The introduced amount of a hydrophilic group of the colorant 1-1 obtained was $120 \times 10^{-6}$ equivalent per gram of the pigment.

Colorant 1-2: Cyan

A mixture of 20 parts of a phthalocyanine pigment (C.I. Pigment Blue 15:3) and 500 parts of quinoline was dispersed for 2 hours by an Eiger Motor Mill M Type 250 (manufactured by EIGER JAPAN K.K.) under the conditions of a beads packing ratio of 70% and rotation number of 5000 rpm, A mixture of the pigment paste thus dispersed and a solvent was transferred to an evaporator, and was heated to 120° C. while reducing the pressure to 30 mmHg or lower. After distilling off water contained in the system as completely as possible, the temperature was controlled to 160° C. Then, 20 parts of sulfonated pyridine complex was added, and the reaction was carried out for 8 hours. After the completion of the reaction, the product was was washed several times with an excessive amount of quinoline, followed by pouring into water and filtering, to obtain colorant 1-2 (cyan pigment particles having a hydrophilic group on the surfaces thereof).

The introduced amount of a hydrophilic group of the colorant 1-2 obtained was $40 \times 10^{-6}$ equivalent per gram of the pigment.

Colorant 1-3: Yellow

By the same treatment method as the preparation of above-described colorant 1-2, except that "20 parts of an isoindolinone pigment (C.I. Pigment Yellow 110)" was used in place of "20 parts of a phthalocyanine pigment (C.I. Pigment Blue 15:3)", colorant 1-3 (yellow pigment particles having a hydrophilic group on the surfaces thereof) was obtained.

The introduced amount of a hydrophilic group of the colorant 1-3 obtained was $45 \times 10^{-6}$ equivalent per gram of the pigment.

Colorant 1-4: Magenta

By the same treatment method as the preparation of above-described colorant 1-2, except that "20 parts of an isoindolinone pigment (C.I. Pigment Red 122)" was used in place of "20 parts of a phthalocyanine pigment (C.I. Pigment Blue 15:3)", colorant 1-4 (magenta pigment particles having a hydrophilic group on the surfaces thereof) was obtained.

The introduced amount of a hydrophilic group of the colorant 1-4 obtained was $60 \times 10^{-6}$ equivalent per gram of the pigment.

Preparations of Colorants (Colorant 2-1 to 2-4) Each Enclosing the Pigment with a Polymer (Copolymer) of a Dispersing Agent having a Polymerizable Group and a Monomer Copolymerizable Monomer The colorant was obtained, after dispersing well a pigment in an aqueous organic solvent and/or water using a dispersing agent having a polymerizable group, by carrying out a polymerization reaction of the dispersing agent having a polymerizable group alone or together with other copolymerizable monomer in the presence of a polymerization initiator in a reaction vessel equipped with a stirrer, a thermometer, a temperature controller, a reflux condenser, a dropping funnel, etc., at a definite temperature for a definite reaction time. The mean particle size of the colorant was measured by a laser Doppler system particle distribution measurement machine, Microtrac UPA 150, manufactured by Leads & Northrup Corporation. In addition, the glass transition temperature of the polymer of the colorant was measured by a heat-scanning type calorimeter (differential scanning calorimeter: DSC) manufactured by Seiko Denshi K.K., and was obtained by the above-described method.

Colorant 2-1: Black

The colorant 2-1 was produced by the method same as Example 1 described in Japanese Patent Laid-Open No. 316909/1998. Into 250 parts by weight of water were added 100 parts by weight of carbon black (Raven C: manufactured by Columbia Ribbon & Carbon Mfg. Co.) and 60 parts by weight of a polymerizable surface active agent represented by formula (IV), Adekarea Soap SE-10N (manufactured by ASAHI DENKA KOGYO K.K.), and after applying ultrasonic waves, the mixture was further subjected to a dispersion treatment by a sand mill (manufactured by Yasukawa Seisakusho K.K.) for about 2 hours. The dispersion obtained by dispersing the carbon black with the polymerizable surface-active agent was placed in a reaction vessel equipped with a ultrasonic generator, a stirrer, a temperature controller, a reflux condenser, and a dropping funnel. Then, an emulsion was previously prepared by mixing 30 parts by weight of acrylonitrile, 9 parts by weight of styrene, 51 parts of n-butyl acrylate, 10 parts by weight of methacrylic acid, 10 parts by weight of the above-described polymerizable surface-active agent, 1 part by weight of potassium persulfate and 100 parts by weight of water, and this emulsion was gradually added dropwise to the above-described reaction vessel using the dropping funnel. After finishing the dropwise addition, the polymerization reaction was carried out at 60° C. for 48 hours. The dispersion of the colorant obtained was neutralized with potassium hydroxide to control the pH to about 8, and coarse particles were removed by filtering with a filter of 0.4 μm, to obtain a dispersion of the objected colorant. Measuring the mean particle size by a laser Doppler system particle distribution measurement machine, Microtrac UPA 150 (Leads & Northrup UPA 150), manufactured by Leads & Northrup Corporation, the mean particle size was found to be 105 nm. In addition, measuring the glass transition temperature of colorant 2-1 by a heat-scanning type calorimeter (differential scanning calorimeter: DSC) DSC 200 manufactured by Seiko Denshi K.K., the glass transition temperature of the polymer of the colorant was found to be 10° C.

Colorant 2-2: Cyan

By following the same method as above-described (colorant 2-1), except that C.I. Pigment Blue 15:3 (copper phthalocyanine pigment: manufactured by Clariant Corporation) was used in place of the carbon black pigment, a dispersion of the objected colorant was obtained. Measuring the mean particle size by a laser Doppler system particle distribution measurement machine, Microtrac UPA 150, manufactured by Leads & Northrup Corporation, the mean particle size was found to be 85 nm. In addition, measuring the glass transition temperature of colorant 2-2 by a heat-scanning type calorimeter (differential scanning calorimeter: DSC) DSC 200 manufactured by Seiko Denshi K.K., the glass transition temperature of the polymer of the colorant was found to be 10° C.

Colorant 2-3: Magenta

By following the same method as above-described (colorant 2-1), except that C.I. Pigment Red 122 (dimethylquinacridone: manufactured by Clariant Corporation) was used in place of the carbon black pigment, a dispersion of the objected colorant was obtained. Measuring the mean particle size by a laser Doppler system particle distribution measurement machine, Microtrac UPA 150, manufactured by Leads & Northrup Corporation, the mean particle size was found to be 90 nm. In addition, measuring the glass transition temperature of colorant 2-3 by a heat-scanning type calorimeter (differential scanning calorimeter: DSC) DSC 200 manufactured by Seiko Denshi K.K., the glass transition temperature of the polymer of the colorant was found to be 10° C.

Colorant 2-4: Yellow

By following the same method as above-described (colorant 2-1), except that C.I. Pigment Yellow 180 (diketopyrolopyrrole: manufactured by Clariant Corporation) was used in place of the carbon black pigment, a dispersion of the objected colorant was obtained. Measuring the mean particle size by a laser Doppler system particle distribution measurement machine, Microtrac UPA 150, manufactured by Leads & Northrup Corporation, the mean particle size was found to be 80 nm. In addition, measuring the glass transition temperature of colorant 2-4 by a heat-scanning type calorimeter (differential scanning calorimeter: DSC) DSC 200 manufactured by Seiko Denshi K.K., the glass transition temperature of the polymer of the colorant was found to be 10° C.

Preparation of Polymer Fine Particles

A reaction vessel was made so as to be equipped with a dropping funnel, a thermometer, a water-cooling type reflux condenser and a stirrer, 100 parts of ion-exchange water was placed in the reaction vessel, and while stirring, 0.2 part of potassium persulfate as a polymerization initiator was added thereto at 70° C. under a nitrogen atmosphere. A monomer solution prepared by dissolving 0.05 part of sodium lauryluslfate, 4 parts of glycidol acrylate, 5 parts of styrene, 6 parts of tetrahydrofurfuryl alcohol, 5 parts of butyl methacrylate and 0.02 part of t-dodecylmercaptan in 7 parts of ion-exchanged water was added dropwise thereto at 70° C. to carry out a reaction, to thereby prepare a primary substance. To the primary substance was added 2 parts of a solution of 10% ammonium persulfate followed by stirring. Furthermore, a reaction liquid made of 30 parts of ion-exchange water, 0.2 part of potassium laurylsulfate, 30 parts of styrene, 25 parts of butyl methacrylate, 6 parts of butyl acrylate, 2 parts of acrylic acid, 1 part of 1,6-hexanediol methacrylate and 0.5 part of t-dodecylmercaptan was added to the mixture at 70° C. with stirring to carry out a polymerization reaction. Thereafter, the reaction mixture was neutralized with sodium hydroxide to pH of from 8 to 8.5, followed by filtering with a filter of 0.3 m, to thereby prepare an aqueous dispersion of polymer fine particles.

Preparation of Inks

Inks having the following compositions (see, Table 1 and Table 2 below) were prepared by the following operations. A previously prepared aqueous medium made of each of the various water-soluble organic solvents and water was gradually added dropwise to the dispersion of the colorant obtained as described above in a state of being stirred, and after finishing the addition, the mixture was sufficiently stirred. By filtering the mixture with a membrane filter of 5 μm, each ink was obtained.

The numeral values about each ink composition in the following Tables 1 and 2 indicate the contents of the constituents in terms of weight % with respect to the whole amount of each ink. The colorant was added in the form of a dispersion thereof. Accordingly, the amount of the dispersion thereof to be added is calculated from the content of the colorant in the ink and the solid component concentrations of the dispersion of the colorant.

In addition, Olfin E1010 (manufactured by Nisshin Kagaku Kogyo K.K.), Olfin STG (manufactured by Nisshin Kagaku Kogyo K.K.), and Surfynol 465 (manufactured by Air Product Corporation) are acetylene glycol-based surface-active agents. Surfynol 61 (manufactured by Air Product Corporation) is an acetylene alcohol-based surface-active agent.

Further, the surface tensions shown in following Tables 1 and 2 were measured by an automatic surface tension meter Type CBVP-2, manufactured by Kyowa Kaimen Kagaku K.K.).

Regarding the colorant and the compound represented by formula (1) shown in the tables, the numerals in the upper row represent the above-described contents and the indications in the lower row represent the kinds of the colorants and the compounds represented by formula (1), respectively.

That is, the compounds represented by the above-noted indications in the tables are as follows.

[1-1]: The compound represented by formula (1), which is prepared by adding 1.5 mols, on average, of propyleneoxy group to methyl isobutyl carbinol and then adding 5 mols, on average, of an ethyleneoxy group, to thereby convert the terminal groups to OH groups.

[1-2]: The compound represented by formula (1), which is prepared by adding, on average, 2 mols of a propyleneoxy group to isooctanol, and then introducing a sulfonic acid group to the terminal OH group, and in which a sodium ion is used as a counter ion.

TABLE 1

|  | Ink ST1 | Ink ST2 | Ink ST3 | Ink ST4 | Ink ST5 |
|---|---|---|---|---|---|
| Colorant | 7.5<br>1-1 | 4.0<br>1-2 | 6.0<br>1-3 | 7.0<br>1-4 | 6.0<br>1-1 |
| Polymer fine particles |  |  |  |  | 4.0 |
| Olfin E1010 | 1.0 | 0.5 |  |  |  |
| Olfin STG |  | 0.3 |  |  |  |
| Surfynol 465 |  |  | 1.0 | 0.7 | 1.0 |
| Surfynol 61 |  |  |  | 0.3 |  |
| DEGmBE | 5.0 | 5.0 |  |  |  |
| DPGmBE |  | 1.0 |  |  |  |
| TEGmBE |  |  | 5.0 | 5.0 |  |
| PGmBE |  |  |  | 2.0 |  |
| 1,2-Pentanediol | 2.0 |  |  |  |  |
| 1,2-Hexanediol |  |  |  |  | 3.0 |
| Compound represented by formula (1) | 0.5<br>1-2 |  | 1.0<br>1-2 |  |  |
| 1,5-Pentanediol |  | 2.0 |  | 1.0 |  |
| 1,6-Hexanediol |  |  | 1.0 |  |  |
| Glycerol | 10.0 | 15.0 | 13.0 | 16.0 | 12.0 |
| Diethylene glycol | 2.0 |  | 2.0 |  |  |
| Tetraethylene glycol |  | 1.0 |  | 1.0 | 1.0 |
| Dipropylene glycol |  | 2.0 | 1.0 | 1.0 |  |
| Thio diglycol |  |  |  | 0.5 |  |
| Trimethylolpropane |  |  | 3.0 |  |  |
| 2-pyrrolidone | 2.0 | 2.0 | 2.0 | 2.0 | 2.0 |
| Triethanolamine | 0.9 | 0.6 |  | 0.6 | 0.6 |
| Tri-isopropanolamine |  |  | 0.6 |  |  |
| Potassium hydroxide |  |  |  |  | 0.1 |
| Sodium benzoate |  |  |  | 0.1 |  |
| Proxel XL-2 | 0.03 | 0.03 | 0.03 | 0.03 | 0.03 |
| Benzotriazole | 0.02 | 0.02 | 0.02 | 0.02 | 0.02 |
| Water | Bal. | Bal. | Bal. | Bal. | Bal. |
| Surface tension (mN/m) | 30 | 29 | 30 | 29 | 30 |

TABLE 2

|  | Ink MC1 | Ink MC2 | Ink MC3 | Ink MC4 | Ink MC5 | Ink MC6 | Ink MC7 | Ink MC8 |
|---|---|---|---|---|---|---|---|---|
| Colorant | 7.5<br>2-1 | 4.5<br>2-1 | 5.5<br>2-2 | 5.0<br>2-2 | 3.0<br>2-3 | 5.0<br>2-3 | 5.0<br>2-4 | 5.5<br>2-4 |
| Olfin E1010 | 1.0 |  |  |  |  | 1.0 |  |  |
| Olfin STG |  |  | 0.5 |  |  |  |  | 1.0 |
| Surfynol 465 |  | 1.2 |  |  |  |  | 1.0 |  |
| Surfynol 61 |  |  |  | 0.5 |  |  | 0.5 |  |
| DEGmBE | 5.0 |  |  |  | 7.0 |  | 4.0 | 10.0 |
| DPGmBE |  | 10.0 |  | 3.0 | 2.0 |  |  |  |
| TEGmBE |  | 10.0 |  | 3.0 |  |  |  |  |
| PGmBE |  |  |  |  |  |  |  | 2.0 |
| 1,2-Pentanediol |  |  |  | 5.0 |  |  |  |  |
| 1,2-Hexanediol |  |  | 10.0 |  |  |  |  |  |
| Compound represented by formula (1) |  |  |  |  |  | 6.0<br>1-1 | 3.0<br>1-2 |  |
| 1,5-Pentanediol | 5.0 |  |  | 2.0 |  | 1.0 |  |  |
| 1,6-Hexanediol |  |  | 5.0 |  |  |  |  |  |
| Glycerol | 9.0 |  |  |  | 14.0 | 15.0 | 15.0 | 7.0 |
| Diethylene glycol |  |  | 7.0 |  |  |  |  | 5.0 |
| Tetraethylene glycol |  |  | 7.0 | 9.0 |  |  |  | 5.0 |
| Dipropylene glycol |  | 5.0 |  |  |  |  |  |  |
| Thio diglycol |  |  | 3.5 |  |  | 2.0 |  |  |
| Trimethylolpropane |  |  |  |  |  |  | 1.0 |  |
| Trimethylolethane |  |  |  |  |  |  | 1.0 |  |
| 1,3-Dimethyl-2-imidazolidinone |  |  |  | 2.0 |  |  |  |  |
| Triethanolamine | 0.8 | 0.9 | 1.0 | 0.7 | 0.9 | 0.9 | 0.5 | 0.9 |
| Potassium hydroxide |  |  | 0.1 |  |  |  |  |  |
| Sodium beazoate |  |  |  | 0.1 |  |  |  |  |
| Proxol XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |

TABLE 2-continued

| | Ink MC1 | Ink MC2 | Ink MC3 | Ink MC4 | Ink MC5 | Ink MC6 | Ink MC7 | Ink MC8 |
|---|---|---|---|---|---|---|---|---|
| Water | Bal. | Bal. | Bal. | Bal. | Bal. | Bal. | Bal. | Bal. |
| Surface tension (mN/m) | 30 | 28 | 29 | 30 | 30 | 29 | 30 | 28 |

In addition, inks N1 to N5 were prepared based on the following compositions.

(Ink N1: Black)

| | weight (%) |
|---|---|
| Carbon black pigment (mean particle size 105 nm) | 5.0 |
| Glycerol | 10.0 |
| Dispersing agent | 3.0 |
| Nonionic surface-active agent | 1.0 |
| Ion-exchanged water | balance |

Carbon Black Pigment:
 Raven C (manufactured by Columbia Ribbon & Carbon Co.)
Nonionic Surface-active Agent:
 Noigen EA160 (manufactured by DAI-ICHI KOGYO SEIYAKU CO., LTD.)
Dispersing Agent:
 Johncryl 62 (manufactured by Johnson Polymer Co., Ltd.)

(Ink N2: Cyan)

| | weight (%) |
|---|---|
| Acid Blue-9 | 5.5 |
| DEGmME | 7.0 |
| Diethylene glycol | 10.0 |
| 2-Pyrrolidone | 5.0 |
| Ion-exchanged water | balance |

(Ink N3: Magenta)

| | weight (%) |
|---|---|
| Acid Red 92 | 5.5 |
| DEGmME | 7.0 |
| Diethylene glycol | 10.0 |
| 2-Pyrrolidone | 5.0 |
| Ion-exchanged water | balance |

(Ink N4: Yellow)

| | weight (%) |
|---|---|
| Direct Yellow 138 | 5.5 |
| DEGmME | 7.0 |
| Diethylene glycol | 10.0 |
| 2-Pyrrolidone | 5.0 |
| Ion-exchanged water | balance |

(Ink N5: Black)

| | weight (%) |
|---|---|
| Direct black 154 | 2.5 |
| Diethylene glycol | 10.0 |
| Nonionic surface-active agent | 1.0 |
| Ion-exchanged water | balance |

Nonionic Surface-active Agent:
 Evan 450 (manufactured by DAI-ICHI KOGYO SEIYAKU CO.,LTD.)

Production of Ink Set

According to the combinations shown in Table 3 below, by filling the ink cartridge for an ink jet printer, EM 900C (manufactured by SEIKO EPSON CORPORATION) with each ink, ink sets of Examples and comparative examples each constituted of a black ink, a cyan ink, a magenta ink, and a yellow ink were prepared.

TABLE 3

| | Black | COLOR INK | | |
|---|---|---|---|---|
| Ink Set | Ink | Cyan ink | Magenta Ink | Yellow Ink |
| Example 1 | ST1 | MC3 | MC5 | MC7 |
| Example 2 | ST1 | MC4 | MC6 | MC8 |
| Example 3 | ST5 | MC3 | MC5 | MC7 |
| Example 4 | ST5 | MC4 | MC6 | MC8 |
| Comp. Example 1 | N1 | N2 | N3 | N4 |
| Comp. Example 2 | ST1 | N2 | N3 | N4 |
| Comp. Example 3 | MC1 | N2 | N3 | N4 |
| Comp. Example 4 | MC2 | N2 | N3 | N4 |
| Comp. Example 5 | N1 | ST2 | ST3 | ST4 |
| Comp. Example 6 | N1 | MC3 | MC5 | MC7 |
| Comp. Example 7 | N1 | MC4 | MC6 | MC8 |
| Comp. Example 8 | ST1 | ST2 | ST3 | ST4 |
| Comp. Example 9 | MC1 | ST2 | ST3 | ST4 |
| Comp. Example 10 | MC2 | ST2 | ST3 | ST4 |
| Comp. Example 11 | MC1 | MC3 | MC5 | MC7 |
| Comp. Example 12 | MC2 | MC4 | MC6 | MC8 |

With respect to the above-described ink sets of the examples and comparative examples, the following evaluation tests were carried out.

Evaluation 1: Printed Density

Using each ink set described above and the ink jet printer, EM900C manufactured by SEIKO EPSON CORPORATION, solid-black printing was applied to each of the papers (12 kinds of papers) shown below at 720 dpi, and the density of the printed portion was determined by measuring the OD value using a color control system, SPM50, manufactured by GRETAG MACBETH AG. Based on the average values of the 12 kinds of the plain papers, the printed density was evaluated.

The papers used for the evaluation were Conqueror paper, Favorit paper, Modo paper, Rapid Copy paper, Epson EPP paper, Xerox P paper, Xerox 4024 paper, Xerox 10 paper, Neenha Bond paper, Ricopy 6200 paper, Yamayuri paper (recycled paper), and Xerox R paper (recycled paper).

Evaluation 2: Color Reproducing Range

Using each ink set described above and the ink jet printer, EM900C manufactured by SEIKO EPSON CORPORATION, a patch pattern for Gamut evaluation was printed with respect to each of the papers (12 kinds of plain papers) used in the evaluation 1. The patch patter for the Gamut evaluation is a pattern by printing while changing the printing duty and the mixing ratio of each color. From the printed patch pattern for the Gamut evaluation, the Gamut value was measured using a spectroscan manufactured by GRETAG-MACBETH AG. The Gamut value shows the volume of a $L^*a^*b^*$ space in the $L^*a^*b^*$ color specification system, and a larger value indicates a broader color reproducing range. Based on the average value of the Gamut values with respect to the 12 kinds of the plain papers, each ink set was evaluated.

The results of the evaluation 1 and the evaluation 2 are shown in Table 4 below.

TABLE 4

| Ink Set | Evaluation 1 (Printed Density) | | | | Evaluation 2 (Color Reproducing Range) |
|---|---|---|---|---|---|
| | B | C | M | Y | |
| Example 1 | 1.45 | 1.20 | 1.25 | 1.22 | $22.0 \times 10^4$ |
| Example 2 | 1.45 | 1.22 | 1.24 | 1.23 | $23.1 \times 10^4$ |
| Example 3 | 1.49 | 1.20 | 1.25 | 1.22 | $22.0 \times 10^4$ |
| Example 4 | 1.49 | 1.22 | 1.24 | 1.23 | $22.6 \times 10^4$ |
| Comp. Example 1 | 1.05 | 1.02 | 0.95 | 1.02 | $13.5 \times 10^4$ |
| Comp. Example 2 | 1.45 | 1.02 | 0.95 | 1.02 | $15.4 \times 10^4$ |
| Comp. Example 3 | 1.30 | 1.02 | 0.95 | 1.02 | $14.3 \times 10^4$ |
| Comp. Example 4 | 1.29 | 1.02 | 0.95 | 1.02 | $14.3 \times 10^4$ |
| Comp. Example 5 | 1.05 | 1.10 | 1.12 | 1.08 | $14.8 \times 10^4$ |
| Comp. Example 6 | 1.05 | 1.20 | 1.25 | 1.22 | $17.5 \times 10^4$ |
| Comp. Example 7 | 1.05 | 1.22 | 1.24 | 1.23 | $17.8 \times 10^4$ |
| Comp. Example 8 | 1.45 | 1.10 | 1.12 | 1.08 | $15.1 \times 10^4$ |
| Comp. Example 9 | 1.30 | 1.10 | 1.12 | 1.08 | $17.0 \times 10^4$ |
| Comp. Example 10 | 1.29 | 1.10 | 1.12 | 1.08 | $16.8 \times 10^4$ |
| Comp. Example 11 | 1.30 | 1.20 | 1.25 | 1.22 | $19.8 \times 10^4$ |
| Comp. Example 12 | 1.29 | 1.22 | 1.24 | 1.23 | $19.6 \times 10^4$ |

B: Black, C: Cyan, M: Magenta, Y: Yellow

As described above, it was confirmed that according to the ink sets of the examples of the invention, images having a high printed density can be obtained, and a wide color reproducing range can be attained.

On the other hand, it was also confirmed that with the ink sets of the comparative examples, a wide color reproducing range cannot be attained.

Evaluation 3: Printed Density (Text Printing)

Using each ink set described above and the ink jet printer, EM900C manufactured by SEIKO EPSON CORPORATION, the OD value was measured in the same manner as in the evaluation 1, except that solid-black printings (3 kinds of printing, that is, text printing by a black ink alone, text printing by 50% a black ink and 50% a composite black, and text printing by a composite black alone) were applied at the 100% duty in the area of 10 mm×10 mm with respect to a plain paper and a recording medium for ink jet, and the printed density was evaluated. In the Table below, the numerical values in the column of NP each represents the average value of the OD values with the 12 kinds of the plain papers as used in the evaluation 1, and the numerical values in the column of IJM each represents the average value of the OD value with the PM photographic papers (manufactured by SEIKO EPSON CORPORATION) and the OD value with the MC photographic papers (manufactured by SEIKO EPSON CORPORATION).

Evaluation 4: Abrasion Resistance (Text Printing)

Using each ink set described above and the ink jet printer, EM900C manufactured by SEIKO EPSON CORPORATION, solid-black printings (3 kinds of printing, that is, text printing by a black ink alone, text printing by 50% a black ink and 50% a composite black, and text printing by a composite black alone) were applied to a plain paper (Xerox 4020 paper, manufactured by Xerox Co.) and to a recording medium for ink jet (Superfine exclusive paper, manufactured by SEIKO EPSON CORPORATION) at the 100% duty in the area of 10 mm×10 mm. After allowing to stand for one hour at a temperature of 25° C., the above-described printed area was rubbed using a yellow water-based fluorescent pen, ZEBRA PEN 2 (trademark), manufactured by Zebra K.K. at a load of 300 g and a speed of 100 mm/second, and the presence of the generation of stains was observed. The result was evaluated in accordance with the criteria shown below. Herein, the composite black is a combination of a magenta ink, a cyan ink and yellow ink at a ratio of 35:28:37.

A: No stain is generated even by rubbing twice.

B: No stain is generated by rubbing once, but stain is generated by rubbing twice.

C: Stain is generated by rubbing once.

The results of the evaluation 3 and the evaluation 4 are shown in Table 5 below.

TABLE 4

| | Black ink alone | | | Black ink 50% Composite black 50% | | | Composite black alone | | |
|---|---|---|---|---|---|---|---|---|---|
| | Evaluation 3 (Printed density) | | Evaluation 4 (Abrasion resistance) | Evaluation 3 (Printed density) | | Evaluation 4 (Abrasion resistance) | Evaluation 3 (Printed density) | | Evaluation 4 (Abrasion resistance) |
| Ink set | NP | IJM | | NP | IJM | | NP | IJM | |
| Example 1 | 1.45 | — | C | 1.42 | 2.02 | B | 1.25 | 1.50 | A |
| Example 2 | 1.45 | — | C | 1.42 | 2.06 | B | 1.24 | 1.50 | A |
| Example 3 | 1.45 | 1.81 | B | 1.41 | 2.10 | A | 1.24 | 1.48 | A |
| Example 4 | 1.45 | 1.81 | B | 1.41 | 2.08 | A | 1.23 | 1.48 | A |
| Comp. Ex. 1 | 1.05 | 1.40 | A | 1.01 | 1.31 | C | 1.02 | 1.20 | A |

TABLE 4-continued

| | Black ink alone | | | Black ink 50% Composite black 50% | | | Composite black alone | | |
|---|---|---|---|---|---|---|---|---|---|
| | Evaluation 3 (Printed density) | | Evaluation 4 (Abrasion resistance) | Evaluation 3 (Printed density) | | Evaluation 4 (Abrasion resistance) | Evaluation 3 (Printed density) | | Evaluation 4 (Abrasion resistance) |
| Ink set | NP | IJM | | NP | IJM | | NP | IJM | |
| Comp. Ex. 2 | 1.45 | 1.40 | C | 1.32 | 1.40 | B | 1.00 | 1.21 | A |
| Comp. Ex. 3 | 1.30 | 1.40 | B | 1.20 | 1.38 | A | 1.00 | 1.21 | A |
| Comp. Ex. 4 | 1.29 | 1.40 | B | 1.16 | 1.31 | A | 0.98 | 1.20 | A |
| Comp. Ex. 5 | 1.05 | 1.60 | A | 1.10 | 1.39 | C | 1.06 | 1.22 | A |
| Comp. Ex. 6 | 1.05 | 1.60 | A | 1.20 | 1.42 | A | 1.20 | 1.30 | A |
| Comp. Ex. 7 | 1.05 | 1.60 | A | 1.21 | 1.42 | A | 1.20 | 1.30 | A |
| Comp. Ex. 8 | 1.45 | — | C | 1.29 | 1.40 | C | 1.05 | 1.22 | C |
| Comp. Ex. 9 | 1.30 | 1.40 | B | 1.20 | 1.38 | C | 1.05 | 1.21 | C |
| Comp. Ex. 10 | 1.29 | 1.40 | B | 1.21 | 1.42 | C | 1.06 | 1.22 | C |
| Comp. Ex. 11 | 1.30 | 1.40 | B | 1.25 | 1.38 | A | 1.10 | 1.26 | A |
| Comp. Ex. 12 | 1.29 | 1.40 | B | 1.24 | 1.42 | A | 1.11 | 1.26 | A |

NP: Plain paper, IJM: Ink jet recording paper

As shown in the above table, in the case of using each of the ink sets of Examples 1 to 4 and carrying out text printing with 50% of the black ink and 50% of the composite black, good results were obtained in the printed density and the abrasion resistance.

Particularly, in the case of using each of the ink sets of Examples 3 and 4, wherein the black ink contained the polymer fine particles, and carrying out text printing with 50% of the black ink and 50% of the composite black, very good results were obtained in the abrasion, resistance.

Then, by using the ink set of Example 1 and also changing the ratio of the black ink and the composite black, text printing was carried out. As a printer, an ink jet printer, EM 900C (manufactured by SEIKO EPSON CORPORATION) was used, and an image was obtained by solid black printing to an area of 10 mm×10 mm at a 100% duty. Conqueror paper, Rapid Copy paper, Xerox 4024 paper and Xerox 10 paper were used as plain papers, exclusive glossy paper, MJA4SP3 for ink jet, manufactured by SEIKO EPSON CORPORATION was used as an exclusive glossy paper, and superfine exclusive glossy paper, MJA4SP1, manufactured by SEIKO EPSON CORPORATION was used as a mat paper.

The printed density and the abrasion resistance of the images obtained were evaluated. The printed density was evaluated in the same manner as the evaluation 1.

The abrasion resistance was evaluated by rubbing thee image with a plastic eraser manufactured by MITSUBISHI PENCIL CO., LTD., at the inclination of 60° and a load of 1 kg. The image of being not peeled off by rubbing thrice or more is evaluated as A, the image of being not peeled off by once as B, the image of being slightly peeled off by once as C, and the image of being considerably peeled off by once as D.

The results are shown is Table 6 below.

TABLE 6

| Kind of Paper | Black Ink (%) | Composite Black (%) | Printed Density | Abrasion Resistance |
|---|---|---|---|---|
| Conqueror Paper | 100 | 0 | 1.35 | B |
| | 80 | 20 | 1.33 | B |
| | 55 | 45 | 1.30 | A |

TABLE 6-continued

| Kind of Paper | Black Ink (%) | Composite Black (%) | Printed Density | Abrasion Resistance |
|---|---|---|---|---|
| | 35 | 65 | 1.22 | A |
| | 0 | 100 | 1.15 | A |
| Rapid Copy Paper | 100 | 0 | 1.36 | B |
| | 80 | 20 | 1.33 | B |
| | 55 | 45 | 1.32 | A |
| | 35 | 65 | 1.23 | A |
| | 0 | 100 | 1.17 | A |
| Xerox 4024 Paper | 100 | 0 | 1.34 | B |
| | 80 | 20 | 1.33 | B |
| | 55 | 45 | 1.31 | A |
| | 35 | 65 | 1.20 | A |
| | 0 | 100 | 1.14 | A |
| Xerox 10 Paper | 100 | 0 | 1.35 | B |
| | 80 | 20 | 1.33 | A |
| | 55 | 45 | 1.30 | A |
| | 35 | 65 | 1.21 | A |
| | 0 | 100 | 1.14 | A |
| Exclusive Glossy Paper | 100 | 0 | 1.65 | D |
| | 80 | 20 | 1.60 | C |
| | 55 | 45 | 1.55 | C |
| | 35 | 65 | 1.55 | B |
| | 0 | 100 | 1.55 | A |
| Superfine Exclusive Paper | 100 | 0 | 1.55 | C |
| | 80 | 20 | 1.53 | B |
| | 55 | 45 | 1.52 | B |
| | 35 | 65 | 1.52 | A |
| | 0 | 100 | 1.52 | A |

Also, it was confirmed that as shown in Table 6, in the case of applying text printing on a plain paper, when the composite black and the black ink was used at the weighed ratio of from 20:80 to 65:35, the text prints having a high printed density and being excellent in the abrasion resistance can be surely obtained.

INDUSTRIAL APPLICABILITY

As described above, according to the invention, by using the pigment inks, not only high weather resistance but also a high printed density of images can be obtained, and
hence an ink set for ink jet recording and an ink jet recording process giving a wide reproducing range can be provided.

In addition, according to the invention, an ink jet recording process, which can perform text printing at a high printing density and with excellent abrasion resistance, can be provided.

Furthermore, the invention can provide recorded matter having images formed at a high printed density and over a wide color reproducing range, and also text printed matter (recorded matter) having a high printed density and being excellent in abrasion resistance.

What is claimed is:

1. An ink set for ink jet recording comprising:
a black ink containing at least carbon black dispersible in an aqueous medium without a dispersing agent and water; and
   at least one color ink containing at least a colorant enclosing a color pigment with a polymer and water, wherein at least one ink selected from the group consisting of said black ink and said at least one color ink contains at least one water-soluble organic solvent comprising a glycol ether compound that is one or a mixture of two or more selected from the group consisting of diethylene glycol monobutyl ether, triethylene glycol monobutyl ether, propylene glycol monobutyl ether, and dipropylene glycol monobutyl ether.

2. The ink set for ink jet recording according to claim 1, wherein the at least one ink selected from the group consisting of said black ink and said at least one color ink contains at least one surface-active agent selected from the group consisting of acetylene glycol-based surface-active agents and acetylene alcohol-based surface-active agents.

3. The ink set for ink jet recording according to claim 2, wherein said water-soluble solvent is present from 0.5% by weight to 30% by weight with respect to a total amount of the at least one ink.

4. The ink set for ink jet recording according to claim 2, wherein the at least one surface-active agent selected from the group consisting of acetylene glycol-based surface-active agents and acetylene alcohol-based surface-active agents is present in an amount of not more than 5% by weight with respect to a total amount of the at least one ink.

5. The ink set for ink jet recording according to claim 2, wherein said at least one ink selected from the group consisting of said black ink and said at least one color ink contains:
   not more than 0.5% by weight of the at least one surface-active agent selected from the group consisting of the acetylene glycol-based surface-active agents and the acetylene alcohol-based surface-active agents; and
   not less than 1% by weight the glycol ether compound.

6. The ink set for ink jet recording according to claim 2, wherein said at least one ink selected from the group consisting of said black ink and said at least one color ink contains not more than 10% by weight of a 1,2-alkylene glycol having from 4 to 10 carbon atoms with respect to a total amount of the at least ink.

7. The ink set for ink jet recording according to claim 6, wherein said 1,2-alkylene glycol is 1,2-pentanediol and/or 1,2-hexanediol.

8. The ink set for ink jet recording according to claim 2, wherein said at least one ink selected from the group consisting of said black ink and said at least one color ink contains not more than 10% by weight of a compound represented by formula (1)

RO-(EP)$_n$-M                                    (1)

wherein
   R: a group having from 4 to 10 carbon atoms selected from the group consisting of an alkyl group, a cycloalkyl group, a phenyl alkyl group and an aryl group;
   O: an oxygen atom;
   EP: a repeating unit of an ethyleneoxy group and/or a propylene oxy group;
   n: an average value in the molecule and is from 1 to 30; and
   M: a hydrogen atom, a sulfonate group, a phosphate group or a borate group.

9. The ink set for ink jet recording according to claim 1, wherein said water-soluble organic solvent is present from 0.5% by weight to 30% by weight with respect to a total amount of the at least one ink.

10. The ink set for ink jet recording according to claim 1, wherein at least one surface-active agent selected from the group consisting of acetylene glycol-based surface-active agents and acetylene alcohol-based surface-active agents is present in an amount of not more than 5% by weight with respect to a total amount of the at least one ink.

11. The ink set for ink jet recording according to claim 1, wherein said at least one ink selected from the group consisting of said black ink and said at least one color ink contains:
   not more than 0.5% by weight of at least one surface-active agent selected from the group consisting of acetylene glycol-based surface-active agents and acetylene alcohol-based surface-active agents; and
   not less than 1% by weight of the glycol ether compound.

12. The ink set for ink jet recording according to claim 1, wherein said at least one ink selected from the group consisting of said black ink and said at least one color ink contains not more than 10% by weight of at least one compound selected from the group consisting of said propylene glycol monobutyl ether and said dipropylene glycol monobutyl ether.

13. The ink set for ink jet recording according to claim 1, wherein said at least one ink selected from the group consisting of said black ink and said at least one color ink contains not more than 20% by weight of at least one compound selected from the group consisting of said diethylene glycol monobutyl ether and said triethylene glycol monobutyl ether.

14. The ink set for ink jet recording according to claim 1, wherein said at least one ink selected from the group consisting of said black ink and said at least one color ink contains not more than 10% by weight of a 1,2-alkylene glycol having from 4 to 10 carbon atoms with respect to a total amount of the at least one ink.

15. The ink set for ink jet recording according to claim 14, wherein said 1,2-alkylene glycol is 1,2-pentanediol and/or 1,2-hexanediol.

16. The ink set for ink jet recording according to claim 1, wherein said at least one ink selected from the group consisting of said black ink and said at least one color ink contains not more than 10% by weight of a compound represented by formula (1):

RO-(EP)$_n$-M                                    (1)

wherein
   R: a group having from 4 to 10 carbon atoms selected from the group consisting of an alkyl group, a cycloalkyl group, a phenyl alkyl group and an aryl group;
   O: an oxygen atom;
   EP: a repeating unit of an ethyleneoxy group and/or a propylene oxy group;
   n: an average value in the molecule and is from 1 to 30; and
   M: a hydrogen atom, a sulfonate group, a phosphate group or a borate group.

17. The ink set for ink jet recording according to claim 1, wherein said polymer enclosing the color pigment comprises, as main component(s), at least one compound selected from the group consisting of polyacrylic acid esters, styrene-acrylic acid copolymers, polystyrenes, polyesters, polyamides, polyimides, silicon-containing polymers and sulfur-containing polymers.

18. The ink set for ink jet recording according to claim 1, wherein said polymer enclosing the color pigment is a copolymer of a dispersing agent having at least a polymerizable group and a copolymerizable monomer copolymerizable with the dispersing agent.

19. The ink set for ink jet recording according to claim 18, wherein said copolymer is obtained by dispersing the color pigment in water with the dispersing agent having a polymerizable group, and then emulsion-polymerizing the dispersing agent and the monomer copolymerizable with the dispersing agent in water using a polymerization initiator.

20. The ink set for ink jet recording according to claim 1, wherein said polymer enclosing the color pigment is a polymer having a crosslinked structure.

21. The ink set for ink jet recording according to claim 20, wherein said polymer having a crosslinked structure is obtained by contacting an organic phase containing at least a crosslinking agent and a polymer having a crosslinking reactive group and a hydrophilic group with an aqueous phase to cause a phase inversion emulsification, thereby enclosing a color pigment with the polymer, and then carrying out a crosslinking reaction of the polymer and a crosslinking agent.

22. The ink set for ink jet recording according to claim 21, wherein said polymer having a crosslinking reactive group and a hydrophilic group comprises, as main component(s), at least one member selected from the group consisting of a vinyl-based polymer, a poly(meth)acrylic acid ester, a styrene-(meth)acrylic acid copolymer, a polyester, a polyamide, a polyimide, a polyurethane, an amino-based polymer, a silicon-containing polymer, a sulfur-containing polymer, a fluorine-containing polymer, and an epoxy-based resin.

23. The ink set for ink jet according to claim 20, wherein said polymer having a crosslinked stricture is a polymer of a dispersing agent having a polymerizable group and a crosslinkable monomer.

24. The ink set for ink jet recording according to claim 23, wherein said polymer having a crosslinked structure is obtained by dispersing a color pigment in water with a dispersing agent having a polymerizable group, and then adding thereto at least a crosslinkable monomer and a polymerization initiator to effect polymerization.

25. The ink set for ink jet recording according to claim 1, wherein said black ink contains polymer fine particles.

26. An ink jet recording process comprising (a) providing the ink set of claim 1; and (b) using the ink set for ink jet recording.

27. Recorded matter printed by the ink jet recording process according to claim 26.

28. The ink set according to claim 1, wherein the glycol ether compound comprises diethylene glycol monobutyl ether.

29. The ink set according to claim 1, wherein the glycol ether compound comprises triethylene glycol monobutyl ether.

30. The ink set according to claim 1, wherein the glycol ether compound comprises propylene glycol monobutyl ether.

31. The ink set according to claim 1, wherein the glycol ether compound comprises dipropylene glycol monobutyl ether.

32. An ink set for ink jet recording comprising:
a black ink containing at least carbon black dispersible in an aqueous medium without a dispersing agent and water; and at least one color ink containing at least a colorant enclosing a color pigment with a polymer and water, wherein at least one ink selected from the group consisting of said black ink and said at least one color ink contains at least one water-soluble organic solvent comprising a glycol ether compound that is one or a mixture of two or more selected from the group consisting of diethylene glycol monobutyl ether, triethylene glycol monobutyl ether, propylene glycol monobutyl ether, and dipropylene glycol monobutyl ether, wherein said at least one ink selected from the group consisting of said black ink and said at least one color ink contains not less than 0.5% by weight of at least one surface-active agent selected from the group consisting of acetylene glycol-based surface-active agents and acetylene alcohol-based surface-active agents, wherein the amount of the glycol ether compound does not exceed 10 times the amount of said surface-active agent.

33. An ink jet recording process comprising:
a black ink containing at least carbon black dispersible in an aqueous medium without a dispersing water; and at least one color ink containing at least a colorant enclosing a color pigment with a polymer and water, wherein at least one ink selected from the group consisting of said black ink and said at least one color ink contains at least one water-soluble organic solvent comprising a glycol ether compound that is one or a mixture of two or more selected from the group consisting of diethylene glycol monobutyl ether, triethylene glycol monobutyl ether, propylene glycol monobutyl ether, and dipropylene glycol monobutyl ether, and (b) using the ink set for ink jet recording, wherein said ink set for ink jet recording comprises a magenta ink, a cyan ink and a yellow ink as the color inks, and wherein text printing is carried out using a composite black formed by combining the magenta ink, the cyan ink and the yellow ink, in combination with said black ink of said ink set for ink jet recording.

34. The ink jet recording process according to claim 33, wherein said black ink contains polymer fine particles, and text printing is carried out onto an ink jet recording medium.

35. The ink jet recording process according to claim 33, wherein said composite black and said black ink are used in a weight ratio of from 20:80 to 65:35.

36. The ink set for ink jet recording comprising:
a black ink containing at least carbon black dispersible in an aqueous medium without a dispersing agent and water; and at least one color ink containing at least a colorant enclosing a color pigment with a polymer and water, wherein at least one ink selected from the group consisting of said black ink and said at least one color ink contains at least one water-soluble organic solvent comprising a glycol ether compound that is one or a mixture of two or more selected from the group consisting of diethylene glycol monobutyl ether, triethylene glycol monobutyl ether, propylene glycol monobutyl ether, and dipropylene glycol monobutyl ether, wherein the at least one ink selected from the group consisting of said black ink and said at least one color ink contains at least one surface-active agent selected from the group consisting of acetylene glycol-based surface-active agents and acetylene alcohol-based surface-active agents, wherein said at least one ink selected from the group consisting of said black ink and said at least one color ink contains not less than 0.5% by weight of the at least one surface-active agent selected from the group consisting of the acetylene glycol-based surface-active agents and the acetylene alcohol-based surface-active agents, and wherein the amount of the glycol ether compound does not exceed 10 times the amount of said surface-active agent.

* * * * *